United States Patent
Nam et al.

(10) Patent No.: US 10,411,266 B2
(45) Date of Patent: Sep. 10, 2019

(54) DRY REFORMING CATALYST, METHOD FOR PREPARING SAME, AND DRY REFORMING METHOD USING CORRESPONDING CATALYST

(71) Applicant: KOREA INSTITUTE OF SCIENCE AND TECHNOLOGY, Seoul (KR)

(72) Inventors: Suk Woo Nam, Seoul (KR); Chang Won Yoon, Seoul (KR); Yeong Cheon Kim, Seoul (KR); Yong Min Kim, Seoul (KR); Jonghee Han, Seoul (KR); Sung Pil Yoon, Seoul (KR); Hyung Chul Ham, Seoul (KR); Jihoon Jeong, Seoul (KR); Seok-Keun Koh, Seoul (KR)

(73) Assignee: KOREA INSTITUTE OF SCIENCE AND TECHNOLOGY, Seongbuk-Gu, Seoul (KR)

( * ) Notice: Subject to any disclaimer, the term of this patent is extended or adjusted under 35 U.S.C. 154(b) by 181 days.

(21) Appl. No.: 15/542,321

(22) PCT Filed: Mar. 4, 2015

(86) PCT No.: PCT/KR2015/002061
§ 371 (c)(1),
(2) Date: Nov. 29, 2017

(87) PCT Pub. No.: WO2016/111411
PCT Pub. Date: Jul. 14, 2016

(65) Prior Publication Data
US 2018/0269493 A1  Sep. 20, 2018

(30) Foreign Application Priority Data
Jan. 7, 2015 (KR) .......... 10-2015-0002191

(51) Int. Cl.
*B01J 23/44* (2006.01)
*B01J 23/89* (2006.01)
(Continued)

(52) U.S. Cl.
CPC .......... *H01M 4/9033* (2013.01); *B01J 23/44* (2013.01); *B01J 23/892* (2013.01); *B01J 35/002* (2013.01);
(Continued)

(58) Field of Classification Search
CPC ........ H01M 4/9033; H01M 4/90; H01M 8/02; H01M 8/06; H01M 8/12; H01M 8/18; B01J 23/44; B01J 23/892
See application file for complete search history.

(56) References Cited

U.S. PATENT DOCUMENTS 7,067,453 B1 * 6/2006 Ming .................... B01J 23/40
423/652
7,604,771 B2 * 10/2009 Song ..................... B01D 53/228
264/674

(Continued)

FOREIGN PATENT DOCUMENTS

| KR | 1020050088023 A | 9/2005 |
| KR | 1020100112386 A | 10/2010 |
| KR | 1020130003912 A | 1/2013 |

OTHER PUBLICATIONS

Chunwen Sun et al., "Recent anode advances in solid oxide fuel cells", Journal of Power Sources, ScienceDirect, Jun. 26, 2007, pp. 247-260, vol. 171, Elsevier B.V.
(Continued)

*Primary Examiner* — Cam N. Nguyen
(74) *Attorney, Agent, or Firm* — Cantor Colburn LLP

(57) ABSTRACT

Provided are: a dry reforming catalyst, in which a noble metal (M) is doped in a nickel yttria stabilized zirconia
(Continued)

complex (Ni/YSZ) and an alloy (M-Ni alloy) of the noble metal (M) and nickel is formed at Ni sites on a surface of the nickel yttria stabilized zircona (YSZ); a method for producing the dry reforming catalyst using the noble metal/glucose; and a method for performing dry reforming using the catalyst. The present invention can exhibit a significantly higher dry reforming activity as compared with Ni/YSZ catalysts. Furthermore, the present invention can have an improved long-term performance by suppressing or preventing the deterioration. Furthermore, the preparing method is useful in performing the alloying of noble metal with Ni at Ni sites on the Ni/YSZ surface and can simplify the preparing process, and thus is suitable in mass production.

18 Claims, 20 Drawing Sheets

(51) Int. Cl.
| | | |
|---|---|---|
| *H01M 4/90* | (2006.01) | |
| *H01M 8/02* | (2016.01) | |
| *H01M 8/06* | (2016.01) | |
| *H01M 8/12* | (2016.01) | |
| *H01M 8/18* | (2006.01) | |
| *B01J 37/08* | (2006.01) | |
| *H01M 8/0612* | (2016.01) | |
| *H01M 8/0637* | (2016.01) | |
| *H01M 4/86* | (2006.01) | |
| *B01J 37/34* | (2006.01) | |
| *B01J 35/00* | (2006.01) | |
| *H01M 8/124* | (2016.01) | |
| *B01J 21/06* | (2006.01) | |
| *B01J 23/755* | (2006.01) | |

(52) U.S. Cl.
CPC ........... *B01J 35/0013* (2013.01); *B01J 37/08* (2013.01); *B01J 37/343* (2013.01); *B01J 37/349* (2013.01); *H01M 4/8647* (2013.01); *H01M 4/905* (2013.01); *H01M 4/9058* (2013.01); *H01M 8/0618* (2013.01); *H01M 8/0637* (2013.01); *H01M 8/12* (2013.01); *B01J 21/066* (2013.01); *B01J 23/755* (2013.01); *H01M 2004/8684* (2013.01); *H01M 2008/1293* (2013.01); *Y02P 70/56* (2015.11)

(56) References Cited

U.S. PATENT DOCUMENTS

| | | | |
|---|---|---|---|
| 7,691,521 B2* | 4/2010 | Ahmed | B01J 23/83 429/465 |
| 7,959,716 B2* | 6/2011 | Song | B01D 53/228 264/44 |
| 8,173,010 B2 | 5/2012 | Ying et al. | |
| 8,524,419 B2* | 9/2013 | Fujimoto | H01M 4/8605 429/532 |
| 8,974,981 B2* | 3/2015 | Goettler | H01M 8/122 429/468 |
| 9,525,181 B2* | 12/2016 | Liu | H01M 8/1286 |
| 2010/0159297 A1* | 6/2010 | Lee | B01J 23/83 429/423 |

OTHER PUBLICATIONS

Dalin Li et al., "Methane reforming to synthesis gas over Ni catalysts modified with noble metals", Applied Catalysis A: General, Sep. 22, 2011, pp. 1-24, vol. 408, Elsevier B.V.

Hyuk Kan et al., "Sn-doped Ni/YSZ anode catalysts with enhanced carbon deposition resistance for an intermediate temperature SOFC", Applied Catalysis B: Environmental, Mar. 30, 2010, pp. 108-114, vol. 97.

Ji Hun Jung et al., "Pd-Ni/YSZ as SOFC anode for internal dry reforming of methane", Theories and Applications of Chem. Eng., Apr. 23, 2014, p. 835, vol. 20, No. 1.

K. Ravindranathan Thampi et al., "Electrocatalysis in Solid Oxide Fuel Cell Electrode Domains", J. Electrochem. Soc., Feb. 1995, pp. 506-513, vol. 142, No. 2, The Electrochemical Society, Inc.

M. Garcia-Dieguez et al., "Improved Pt-Ni nanocatalysts for dry reforming of methane", Applied Catalysis A: General, Feb. 2, 2010, pp. 191-199, vol. 377, No. 1-2, Elsevier B.V.

R.J. Gorte et al., "Recent developments on anodes for direct fuel utilization in SOFC", Solid State Ionics, Science Direct, 2004, pp. 1-6, vol. 175, Elsevier B.V.

Steven McIntosh et al., "Effect of Precious-Metal Dopants on SOFC Anodes for Direct Utilization of Hydrocarbons", Electrochemical and Solid-State Letters, 2003, pp. A240-A243, vol. 6, No. 11.

Wei Wang et al., "Progress in Solid Oxide Fuel Cells with Nickel-Based Anodes Operating on Methane and Related Fuels", Chemical Reviews, Jul. 31, 2013, pp. 8104-8151, vol. 113, American Chemical Society.

International Search Report dated Sep. 18, 2015 for PCT/KR2015/002061.

* cited by examiner

DRY REFORMING CATALYST, METHOD FOR PREPARING SAME, AND DRY REFORMING METHOD USING CORRESPONDING CATALYST

TECHNICAL FIELD

The present disclosure relates to a dry reforming catalyst, a method for preparing the same, and a dry reforming method using the corresponding catalyst.

DESCRIPTION OF THE NATIONAL SUPPORT RESEARCH AND DEVELOPMENT

This study was conducted with the support of the National Research Foundation of Korea (NRF) funded by the Ministry of Science, ICT & Future Planning of Korea under the supervision of Korea Institute of Science and Technology (Global Research Lab Project, Basic studies on durable and cost-effective components for high temperature fuel cells running on alternative fuels, Project Identification No.: 1711001110).

BACKGROUND ART

A device that uses an electrochemical reaction, for example, a solid oxide fuel cell (hereinafter, referred to as SOFC) may be usefully used as a mobile-type or stationary-type power generation device because the device does not release environmentally harmful gases. In general, a high-temperature fuel cell such as a solid oxide fuel cell can use various types of fuels including a hydrocarbon such as methane and/or carbon monoxide because the fuel cell requires a high operating temperature to obtain sufficient oxygen ion conductivity through an oxide-based membrane. In order to produce hydrogen in-situ from these carbon-containing fuels, external or internal steam reforming processes have been widely used.

However, the steam reforming system reduces the efficiency because the system needs to store and supply water from the systematic point of view.

Meanwhile, numerous studies in which bio gas is used as a fuel have been recently conducted. A bio gas that can be obtained from biomass can be converted into synthetic gases ($H_2$+CO) through methane dry reforming or bio gas reforming [hereinafter, referred to as 'dry reforming']. For reference, a major constituent of the bio gas is methane (50 to 60 mol %) and carbon dioxide (40 to 50 mol %). In the dry reforming system, water in the steam reforming is replaced with carbon dioxide. Since the dry reforming directly injects a bio gas of the methane and carbon dioxide without a need for any separate device, the systematic efficiency may be increased, and a compact SOFC system design with an improved efficiency may be possible.

However, since a carbon source is increased on the whole in the dry reforming method as described above, the dry reforming method cannot help but be vulnerable to carbon deposition or deactivation via carbon coking as compared with the steam reforming using water.

Explaining more theoretically, carbon dioxide is less reactive to carbon removal through formation of carbon monoxide ($CO_2$+C->2CO: reverse Boudouard reaction), so that the dry reforming method cannot help but be very sensitive to deactivation via carbon coking or carbon deposition unless steam is added. That is, when a bio gas is directly injected, a thermodynamically more favorable carbon coking occurs based on the C—H—O ternary diagram.

Considering these circumstances, in order to improve the efficiency of the entire system, developing a durable catalyst that may be used in all the reforming reactions which accompany carbon coking and optimizing a fuel composition having an oxygen source (for example: oxygen or water) for preventing carbon deposition are required

DISCLOSURE

Technical Problem

In embodiments of the present invention, in an aspect, provided are a dry reforming catalyst which may exhibit a much higher dry reforming catalytic activity (performance) as compared with existing Ni/YSZ catalysts and have excellent durability and long-term performance by suppressing or preventing the deterioration, a method for preparing the same, and a dry reforming method using the catalyst.

In embodiments of the present invention, in another aspect, provided are a dry reforming catalyst which has simplified preparation processes, and thus is suitable in mass production, a method for preparing the same, and a dry reforming method using the catalyst.

Technical Solution

In embodiments of the present invention, provided is a dry reforming catalyst, in which a noble metal (M) is doped to a nickel yttria stabilized zirconia complex (Ni/YSZ) and an alloy (M-Ni alloy) of the noble metal (M) and nickel is formed at Ni sites on a surface of the nickel yttria stabilized zircona (YSZ).

In other embodiments of the present invention, provided is a solid oxide fuel cell including the dry reforming catalyst.

In still another embodiments of the present invention, provided is a method for preparing a dry reforming catalyst, in which a noble metal precursor supported on glucose (M/glucose; M is a noble metal) is mixed with a nickel yttria stabilized zirconia complex (Ni/YSZ) and is subjected to a heat treatment.

In yet another embodiments of the present invention, provided is a method for improving dry reforming performance and long-term stability of a nickel yttria stabilized zircona (Ni/YSZ) catalyst, comprising doping a noble metal (M) to a nickel yttria stabilized zirconia complex (Ni/YSZ), wherein an alloy (M-Ni alloy) of the noble metal (M) and nickel is formed at Ni sites on a surface of the nickel yttria stabilized zircona (YSZ).

In still yet another embodiments of the present invention, provided is a method for performing dry reforming using a catalyst, comprising doping a noble metal (M) to a nickel yttria stabilized zirconia complex (Ni/YSZ), wherein an alloy (M-Ni alloy) of the noble metal (M) and nickel is formed at Ni sites on a surface of the nickel yttria stabilized zircona (YSZ).

Advantageous Effects

According to embodiments of the present invention, in an aspect, much higher dry reforming activity (performance) may be shown as compared with existing Ni/YSZ catalysts and improved durability or long-term performance (for example, long-term performance after 120 hours) may be shown by suppressing or preventing the deterioration. Accordingly, the catalyst may be very usefully applied to dry-reforming in a fuel cell, particularly, a solid oxide fuel cell.

According to embodiments of the present invention, in another aspect, it is suitable to mass produce the Pd—Ni/YSZ catalyst due to simplified preparation processes.

DESCRIPTION OF DRAWINGS

In FIG. 2, the X-axis is the 2 theta (unit: degree), and the Y-axis is the intensity (unit: arbitrary unit). In FIG. 2, the lower graph is Pd—Ni/YSZ, and the upper graph is Ni/YSZ. The inner box in the graph in FIG. 2 shows the enlargement of the Ni(111) part.

In FIG. 5, the X-axis is the temperature (unit: °C.), and the Y-axis is the conversion rate (unit: %). During the dry reforming, the gas hourly space velocity (GHSV) is 12,000/h, and the flow rate (sccm) of $CH_4:CO_2:N_2$ is 50:50:100 (sccm).

In FIG. 6, the X-axis is the time (unit: hour), and the Y-axis on the left side indicates the carbon deposit [unit: g/g cat.]. In FIG. 6, the lower graph is the Comparative Example (Ni/YSZ), and the upper graph is the Example (Pd—Ni/YSZ).

In FIG. 7, the X-axis is the time (unit: minute), the Y-axis on the left side indicates the carbon deposit [unit: g/g cat.], and the Y-axis on the right side indicates the temperature (unit: °C.).

In FIG. 8, the lower graph shows the Example (Pd—Ni/YSZ), and the upper graph shows the Comparative Example (Ni/YSZ).

In FIG. 9, the X-axis indicates the binding energy (eV), and the Y-axis indicates the intensity (unit: arbitrary unit).

In FIG. 13, the solid line indicates a preferred route proposed based on the DFT method, and the dotted line indicates a possible route extended from the proposed route.

In FIG. 14, the X-axis is the time (unit: hr), and the Y-axis is the conversion rate (Concentration; denoted based on a conversion degree of 1) (unit: none).

In FIG. 15, the X-axis is the temperature (unit:), and the Y-axis is the intensity (unit: arbitrary unit). In FIG. 15, the Comparative Example (Ni/YSZ) is indicated with a solid line, and the Example (Pd—Ni/YSZ) is indicated with a dotted line.

MODE FOR INVENTION

Figure 1A:
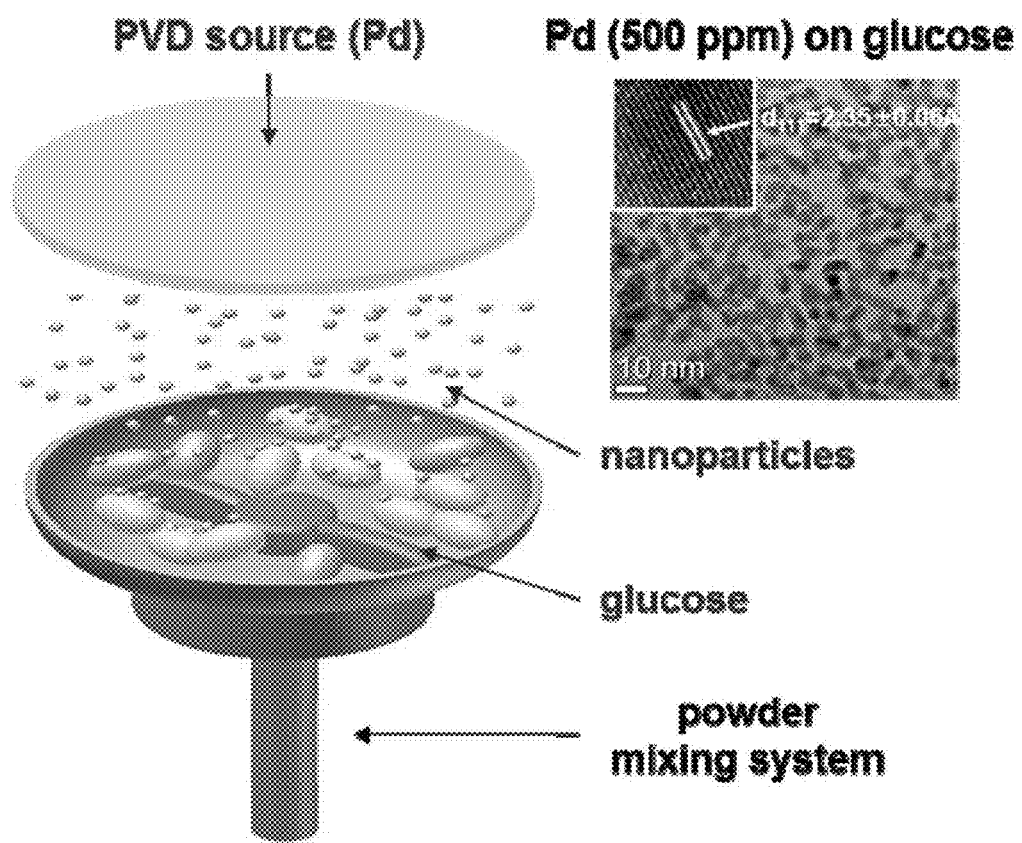
FIG. 1A is a schematic view showing a preparation process for preparing a non-limiting Example (Pd—Ni/YSZ) of the present invention wherein a process of preparing Pd/glucose which is a doping agent by a physical vapor deposition (PVD) method [amount of metal loaded based on the total amount of glucose is 500 ppm] is shown, and an inset TEM image shows metal nanoparticles dispersed on glucose after dissolving the corresponding doping agent in water.

Hereinafter, example embodiments of the present invention will be described in detail.

In the present specification, the improvement of long-term performance or long-term stability or durability means that it is possible to prevent or suppress the deterioration caused by carbon coking, carbon deposition, and the like occurring in case of continuous operation after mounting catalyst.

In the present specification, the dry reforming means a reforming where a reactant is reacted using carbon dioxide instead of water when a hydrocarbon fuel is converted into a fuel such as hydrogen or carbon monoxide.

In the present specification, a noble metal/glucose (M/glucose; M is a noble metal) means that noble metal particles, particularly, noble metal nanoparticles are supported on glucose. For example, the noble metal/glucose may be in a form in which noble metal particles are present while being dispersed on the surface of glucose.

When a noble metal is doped in Ni/YSZ used as a fuel electrode material in a SOFC, particularly, a noble metal and the nickel are alloyed at Ni sites, the electric structure (electronic structure) of nickel is surprisingly modified, and accordingly, the activity and durability of the dry reforming may be improved. That is, by maintaining the oxidation state of Ni at the reduced state through charge transfer from the noble metal to Ni through alloying with the noble metal at Ni sites of Ni/YSZ, the methane activation ($CH_4$ activation) rate may be increased and the carbon growth or carbon deposit on the surface may be suppressed. To this end, not only the durability for a dry reforming reaction, but also the catalytic activity may be improved.

Further, in order to change the aforementioned electrical structure of nickel, when the noble metal is doped in the Ni/YSZ, it is very useful to dope the noble metal by a specific method, that is, using a noble metal/glucose (M/glucose; M is a noble metal) as described below.

Hereinafter, the method will be described in more detail.

In example embodiments of the present invention, provided is a dry reforming catalyst, in which a noble metal (M) is doped in a nickel yttria stabilized zirconia complex (Ni/YSZ) and an alloy (M-Ni alloy) of the noble metal (M) and nickel is formed at Ni sites on a surface of the nickel yttria stabilized zircona (YSZ).

In an example embodiment of the present invention, the noble metal (M) may be Pd, Pt, Ru, Rh, Au, or Ag, particularly, Pd.

In an example embodiment of the present invention, the electrical structure of Ni may be changed by the alloying of noble metal with Ni at the Ni sites. That is, during the alloying at the Ni sites, the charge transfer may occur from the noble metal particles (for example, particles such as Pd) to the Ni side. Accordingly, the oxidation state of nickel is changed into the reduced state [that is, resistance to the oxidation of nickel is increased], and as a result, the activity and durability of the methane dry reforming reaction may be improved.

In an example embodiment of the present invention, the alloying at the Ni sites may suppress carbon growth or carbon deposit formation.

In an example embodiment of the present invention, the alloyed noble metal-nickel alloy (M-Ni alloy) at the Ni sites may promote both $CH_4$ cracking and $CO_2$ mediated carbon oxidation.

In an example embodiment of the present invention, the alloyed noble metal-nickel alloy (M-Ni alloy) at the Ni sites may promote the oxidation of cracked carbon and promote methane activation.

In an example embodiment of the present invention, it is preferable that the catalyst is subjected to dry reforming at a temperature of 750° C. or more, and it is more preferable that the catalyst is subjected to dry reforming at a temperature of 800° C. or more. In order to significantly increase methane cracking and carbon removal (these are essential elements for the methane dry reforming), a high temperature (750° C. or more, particularly, 800° C. or more) may be required.

In an example embodiment of the present invention, the catalyst may be subjected to dry reforming at a temperature of 700° C. to 900° C. or 800° C. to 900° C.

In an example embodiment of the present invention, the dry reforming catalyst may be usefully used as a dry reforming catalyst for improving dry reforming performance and long-term stability of a nickel yttria stabilized zirconia (Ni/YSZ).

In an example embodiment of the present invention, the catalyst may maintain its initial activity after being operated for 120 hours or more.

In an example embodiment of the present invention, the dry reforming catalyst may be usefully used as a dry reforming catalyst of a solid oxide fuel cell.

In an example embodiment of the present invention, the dry reforming catalyst may be usefully used in a fuel electrode of a solid oxide fuel cell.

In other embodiments of the present invention, provided is a solid oxide fuel cell including the aforementioned dry reforming catalyst. In an example embodiment of the present invention, the dry reforming catalyst may be a fuel electrode catalyst of a solid oxide fuel cell.

The method for preparing a dry reforming catalyst according to other example embodiment of the present invention, may provide a dry reforming catalyst by mixing a noble metal precursor supported on glucose (M/glucose; M is a noble metal) with a nickel yttria stabilized zirconia complex (Ni/YSZ) and performing a heat treatment. Pd (noble metal) may be alloyed with Ni at high temperature by performing such heat treatment as described above. Herein, a heat treatment before a reaction may be performed in order to reduce a metal which may be partially oxidized.

When a noble metal is doped to a nickel yttria stabilized zirconia (Ni/YSZ) using a noble metal/glucose (M/glucose) in which noble metal particles are supported on glucose as described above, the preparation process may be much simplified, and as well the electrical structure may be easily changed by inducing the alloying of the noble metal with Ni at Ni sites of Ni/YSZ.

In an example embodiment of the present invention, the dry reforming preparation method may include: providing a noble metal precursor supported on glucose (M/glucose; M is a noble metal); mixing and stirring the noble metal precursor supported on glucose (Pd/glucose) and a nickel yttria stabilized zirconia complex (Ni/YSZ) in a solvent; and filtering the mixed solution and performing a heat treatment under a reduced atmosphere.

In an example embodiment of the present invention, a noble metal precursor supported on glucose may be provided by depositing noble metal particles on glucose being a carrier through a physical vapor deposition (PVD) method.

In an example embodiment of the present invention, the noble metal precursor supported on glucose (M/glucose) may be contained in an amount of more than 0 wt % and 5 wt % or less in the entire catalyst.

In an example embodiment of the present invention, in the noble metal precursor supported on glucose (Pd/glucose), the concentration of the noble metal in glucose may be 500 ppm to 5,000 ppm.

In an example embodiment of the present invention, the heat treatment under the reduced atmosphere may be performed in-situ during the dry reforming.

Hereinafter, each step will be described in detail as follows by taking the case of using a noble metal, particularly, palladium as an example.

Figure 1B:
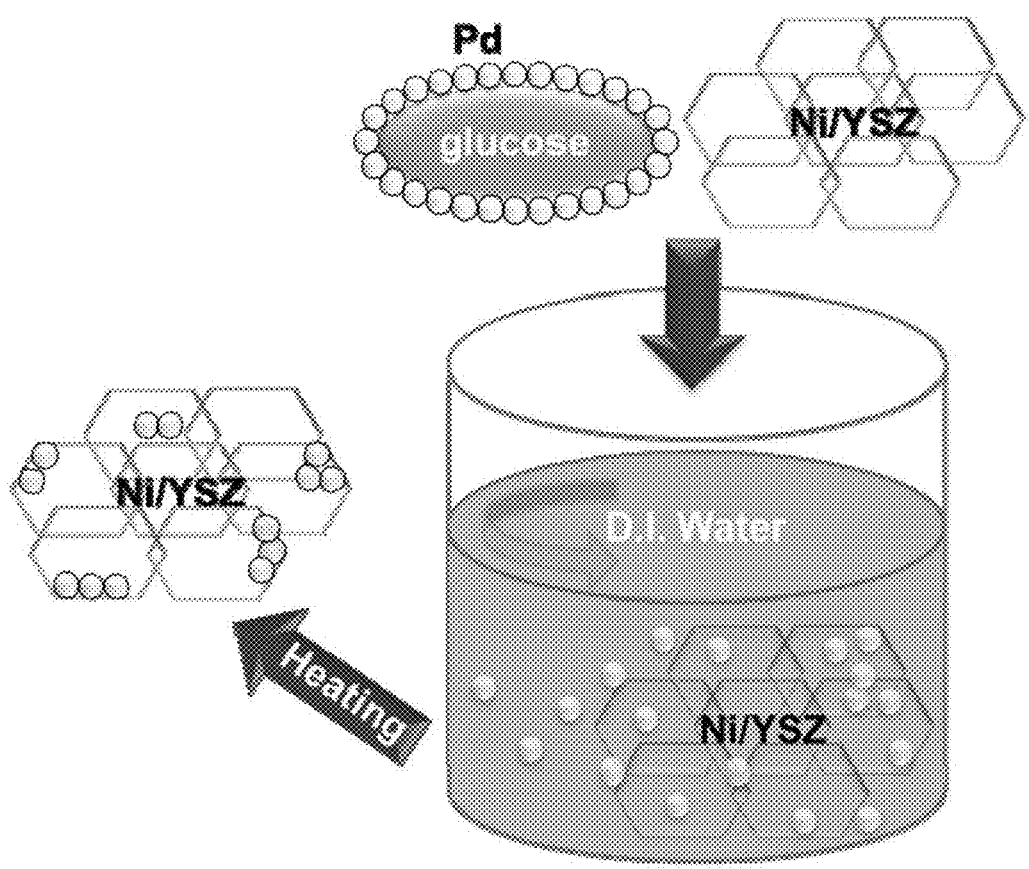
FIG. 1B is a schematic view showing a process of preparing the Pd—Ni/YSZ in the Example using the Pd/glucose.

FIG. 1A is a schematic view showing a preparation process for preparing a non-limiting Example (Pd—Ni/YSZ) of the present invention wherein a process of preparing Pd/glucose which is a doping agent by a physical vapor deposition (PVD) method [amount of metal loaded based on the total amount of glucose is, for example, 500 ppm] is shown, and an inset TEM image shows metal nanoparticles dispersed after dissolving the corresponding doping agent in water. FIG. 1B is a schematic view showing a process of preparing the Pd—Ni/YSZ in the Example using the Pd/glucose.

As shown in FIGS. 1A and 1B, first, a palladium precursor supported on glucose is prepared. In example embodiments of the present invention, instead of directly doping a noble metal precursor in a nickel yttria stabilized zirconia complex (Ni/YSZ), the doping is performed by supporting the noble metal precursor on glucose, and using the supported noble metal precursor. The glucose serves a role as a kind of carrier for doping a noble metal. Glucose is removed while being filtered, and a catalyst in which a noble metal is doped to a nickel yttria stabilized zirconia complex (Ni/YSZ) is finally provided.

As illustrated in FIG. 1A, a palladium/glucose may be prepared using a PVD process. That is, it is possible to prepare a precursor in which the palladium particles are supported on a glucose carrier by depositing noble metal particles such as palladium particles on the glucose carrier using a physical vapor deposition method.

Next, the palladium precursor supported on glucose (Pd/glucose) and the nickel yttria stabilized zirconia complex (Ni/YSZ) are mixed and stirred (for example, stirred for 24 hours using a magnetic bar) in a solvent.

In a non-limiting example, as the solvent, deionized water may be used. When an organic solvent needs to be used, it is possible to use an organic solvent which may be highly polar so as to dissolve glucose. Furthermore, the glucose may be dissolve in an organic solvent in accordance with the solubility of glucose in a desired solvent, and then doping may be performed.

In a non-limiting example, the palladium/glucose (Pd/glucose) may be contained in an amount of more than 0 wt % and 5 wt % or less in the entire catalyst. When the content is more than 5 wt %, an effect obtained from the improvement in performance is not so big, and noble metal particles such as palladium are expensive so that the palladium/glucose is not efficient even in terms of price.

In a non-limiting example, the weight ratio (or concentration) of palladium in the glucose may be 500 ppm to 5,000 ppm.

Next, the mixed solution is filtered to recover the catalyst, and then the catalyst is put into an oven and dried (for example, dried at 80° C. for 4 hours). A dry reforming catalyst in which palladium is doped to a nickel yttria stabilized zirconia complex (Ni/YSZ) is prepared by recovering the dried catalyst and performing a heat treatment under a high-temperature reduced atmosphere (for example, at 750° C. under 25% $H_2/N_2$ for 3 hours). As described above, performing of the heat treatment is for alloying Pd (noble metal) and Ni at high temperature, and a heat treatment is performed under a reduced atmosphere in order to reduce Ni and Pd (noble metal) which may be partially oxidized.

The heat treatment is performed, and then a catalyst is prepared. The prepared catalyst has excellent activity and durability as described above, and may maintain an initial catalytic activity even after being operated for, for example, 120 hours or more.

Meanwhile, in yet another embodiments of the present invention, provided is a method for improving dry reforming performance and long-term stability of a nickel yttria stabilized zircona (Ni/YSZ) catalyst, comprising doping a noble metal (M) to a nickel yttria stabilized zirconia complex (Ni/YSZ), wherein an alloy (M-Ni alloy) of the noble metal (M) and nickel is formed at Ni sites on a surface of the nickel yttria stabilized zirconia (YSZ).

Furthermore, in still yet another embodiments of the present invention, provided is a method for performing dry reforming using a catalyst, in which a noble metal (M) is doped in a nickel yttria stabilized zirconia complex (Ni/YSZ) and an alloy (M-Ni alloy) of the noble metal (M) and nickel is formed at Ni sites on a surface of the nickel yttria stabilized zircona (YSZ).

In an example embodiment of the present invention, the dry reforming performance and durability of the catalyst are excellent particularly when the operation temperature of a solid oxide fuel cell to which the catalyst is mounted is 750° C. or more, preferably 800° C. or more. Therefore, in the method for improving the performance and long-term stability of the nickel yttria stabilized zirconia (Ni/YSZ) catalyst or the dry reforming method, it is preferred to set the dry reforming temperature, for example, the operation temperature of a solid oxide fuel cell to which the catalyst is mounted to 750° C. or more or 800° C. or more. In an example embodiment, the catalyst may be subjected to dry reforming at a temperature of 700° C. to 900° C. or 800° C. to 900° C.

In an example embodiment, the dry reforming may be performed by mounting the catalyst to a solid oxide fuel cell, and operating the solid oxide fuel cell in the above-described temperature range (750° C. or more, preferably 800° C. or more, for example, 750° C. to 900° C. or 800° C. to 900° C.).

Hereinafter, the present invention will be described in more detail through Examples and experiments, but the present invention is not limited thereto described below.

Preparation of Catalysts in Examples and Comparative Examples

Comparative Examples

First, an Ni/YSZ cermet was prepared as follows.

NiO (Sumitomo), YSZ (Tosoh TZ-8Y), polymethylmethacrylate (Aldrich) were mixed at a weight ratio of 50:50:15, and the resulting mixture was ball-milled for 24 hours, and subsequently, sintered at 1,500° C. for 5 hours.

An Ni/YSZ cermet was prepared by reducing the obtained NiO/YSZ powder under a high-temperature reduced atmosphere. The reduced atmosphere was 800° C. and 25% $H_2/75\% N_2$, and the reduction time was 12 hours. The obtained Ni/YSZ cermet was used as a Comparative Example.

Examples

Meanwhile, in order to prepare Pd—Ni/YSZ being the Example, metal nanoparticles dispersed in glucose (Pd nanoparticles/glucose), prepared by physical vapor deposition (PVD) were used.

Specifically, an aqueous solution [25 mL] in which Pd/glucose (18 g) was dissolved in D.I. water was subjected to sonification for 1 hour, and the resulting product was mixed with the Ni/YSZ powder prepared by the above-described method. The obtained heterogeneous mixture was stirred at room temperature for 24 hours, filtered, and then dried at 40° C. The dried powder was heated under a reduced atmosphere of 750° C. and 25% $H_2/75 N_2$ for 4 hours. Through the process, Pd nanoparticles were reacted with Ni species exposed to the Ni/YSZ surface to form a Pd—Ni alloy (this will be described below in more detail).

Through inductively-coupled plasma mass spectrometry (Agilent ICP-MS 7700S), it was confirmed that 0.604 parts by weight of palladium particles were loaded based on 100 parts by weight of the total nickel amount in the Ni/YSZ.

[Experiments]

Analysis of Physical Characteristics

In order to identify the crystal structures of Ni/YSZ (Comparative Example) and Pd—Ni/YSZ (Example), a power X-ray diffractometer (XRD, Rigaku Mini Flex II) using a 1.54 Å Cu Kα radiation was used. Furthermore, the shape and morphology of a catalyst were analyzed using a high-resolution transmission electron microscope (HR-TEM, FEI Tecnai F20).

Furthermore, an X-ray photoelectron spectroscopy (XPS, PHI 50000 VersaProbe, Ulvac-PHI) using a monochromator Al Kα X-ray (1486.6 eV) was used. The collected peak was calibrated to the C 1s peak (284.6 eV) under a background pressure of $6.7 \times 10^{-8}$ Pa.

Meanwhile, in order to identify the electrical effect (electronic effect) of Pd—Ni alloying in the Example Pd—Ni/YSZ, an analysis was performed by deconvolution to a Gaussian function.

Furthermore, the weight change of the Ni/YSZ (Comparative Example) and the Pd—Ni/YSZ (Example) during the supply of methane or carbon dioxide was observed by performing an in-situ thermogravimetric analysis (TGA).

Figure 2:
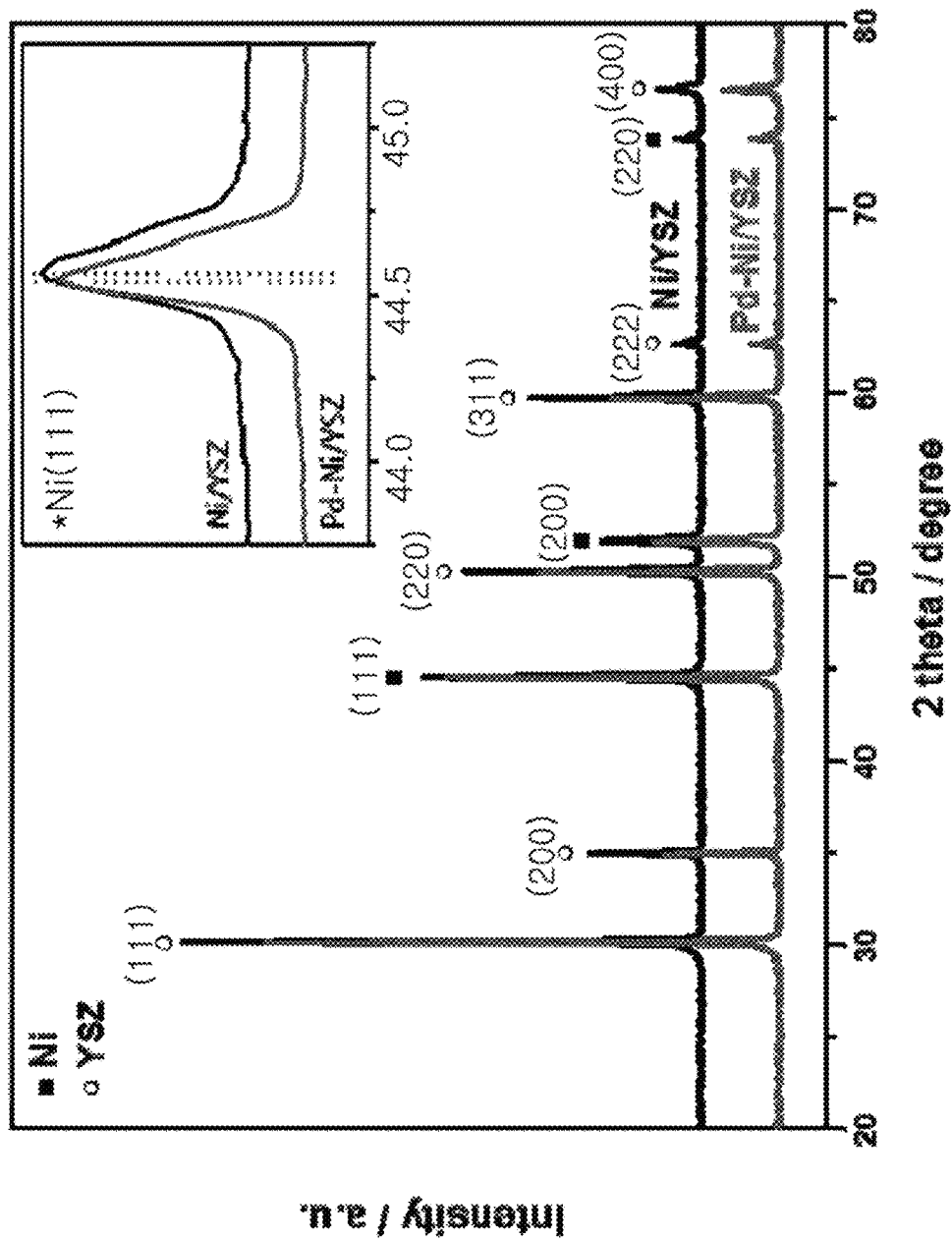
FIG. 2 is a graph showing XRD patterns of the Example (Pd—Ni/YSZ) and the Comparative Example (Ni/YSZ) of the present invention.

FIG. 2 is a graph showing XRD patterns of the Example (Pd—Ni/YSZ) and the Comparative Example (Ni/YSZ) of the present disclosure. In FIG. 2, the X-axis is the 2 theta (unit: degree), and the Y-axis is the intensity (unit: arbitrary unit). In FIG. 2, the lower graph is Pd—Ni/YSZ, and the upper graph is Ni/YSZ. The inner box in the graph in FIG. 2 shows the enlargement of the Ni(111) part.

As can be seen in FIG. 2, it could be seen that as a result of XRD analysis, in the case of Pd—Ni/YSZ (Example), the peak corresponding to Pd—Ni/YSZ slightly shifted toward a lower angle side as compared with that of Ni/YSZ (Comparative Example). This means the formation of a Pd—Ni alloy induced by the lattice expansion of Ni when Pd is introduced. For reference, the slight shift of the XRD peak was due to a small amount of Pd (0.64 parts by weight).

In order to identify characteristics of the Pd—Ni/YSZ cermet, an additional analysis was performed using TEM and TEM-EDS.

Figure 3A:
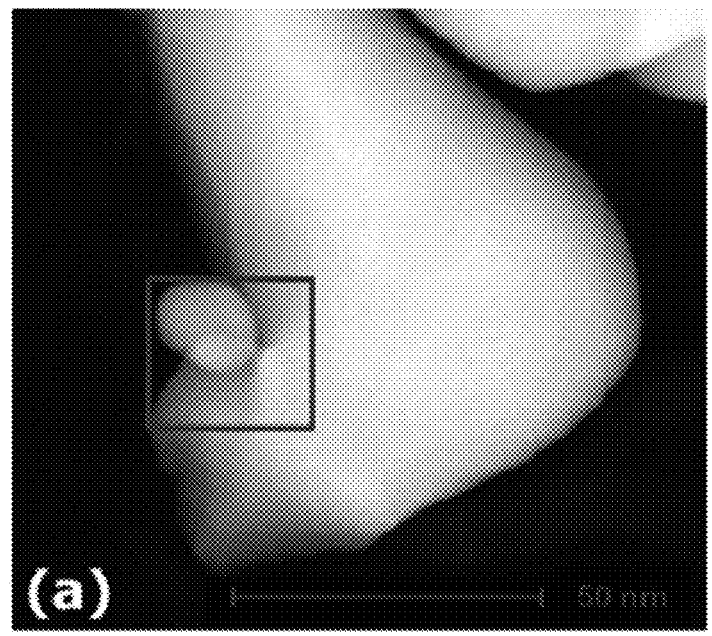
FIG. 3A is a TEM image of the non-limiting Example (Pd—Ni/YSZ) of the present invention.
Figure 3B:
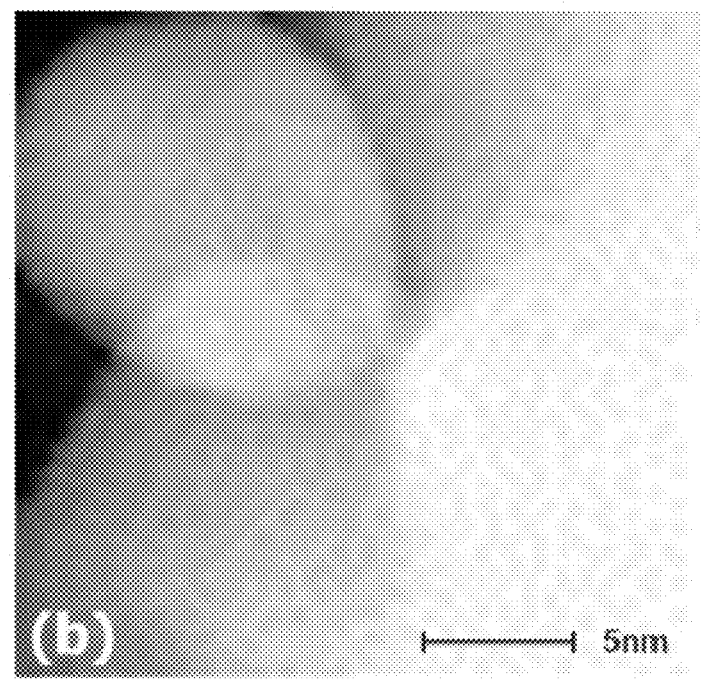
FIG. 3B shows an enlargement of the square part in FIG. 3A, and FIGS. 3C to 3E show the elemental mapping of Zr, Pd, and Ni, respectively.
Figure 3C:
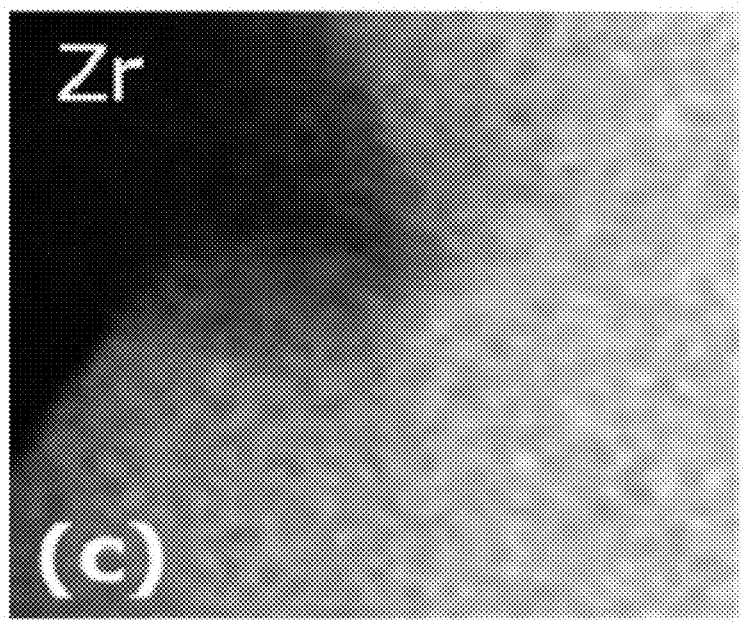

FIG. 3A is a TEM image of the non-limiting Example (Pd—Ni/YSZ) of the present disclosure. FIG. 3B shows an enlargement of the square part in FIG. 3A, and FIGS. 3C to 3E show the elemental mapping of Zr, Pd, and Ni, respectively.

Figure 3D:
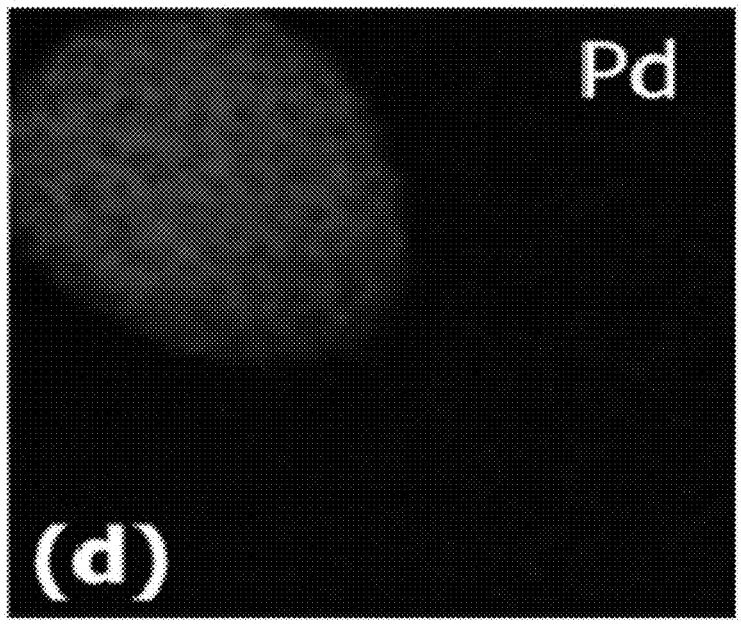
Figure 3E:
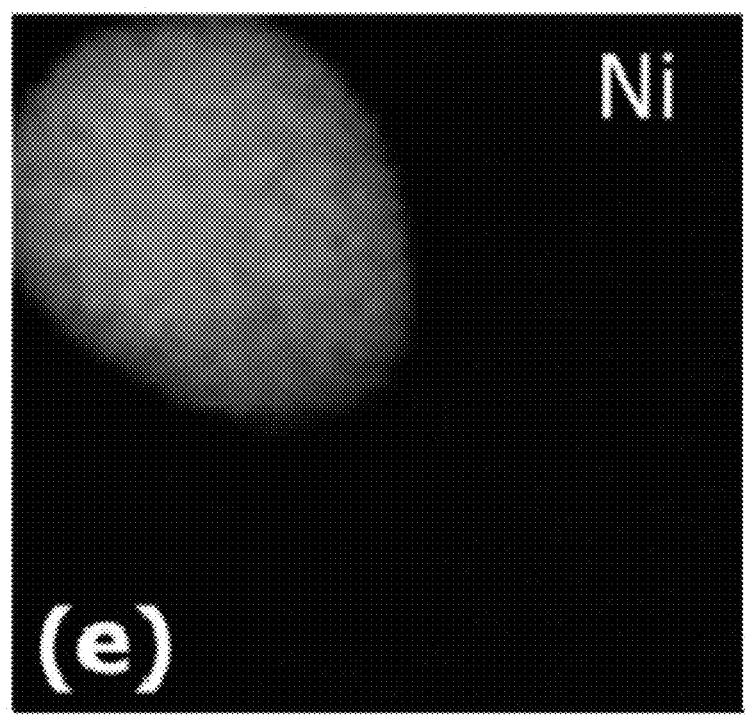

Referring to FIGS. 3D and 3E, it can be seen that Pd nanoparticles were first doped in Ni sites of Ni/YSZ during the elemental mapping. The result supports that a Pd—Ni alloy was formed.

Figure 4A:
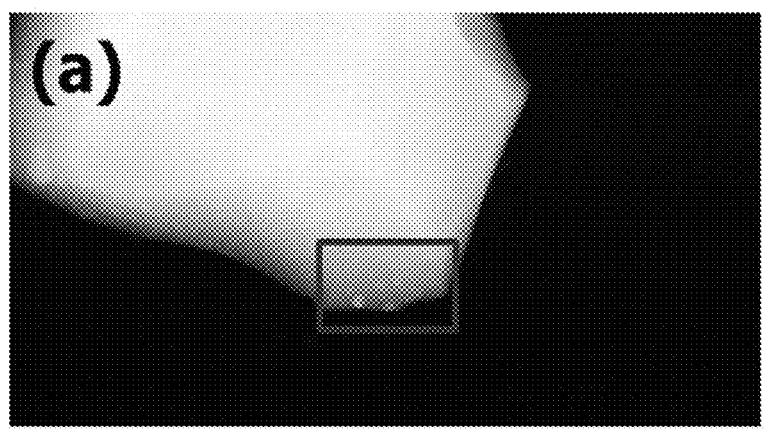
FIG. 4A is a TEM-EDS image of the non-limiting Example (Pd—Ni/YSZ) of the present invention.
Figure 4B:
FIG. 4B shows the enlargement of the square part in FIG. 4A, and FIGS. 4C to 4E show the elemental mapping of Zr, Pd, and Ni, respectively.
Figure 4C:
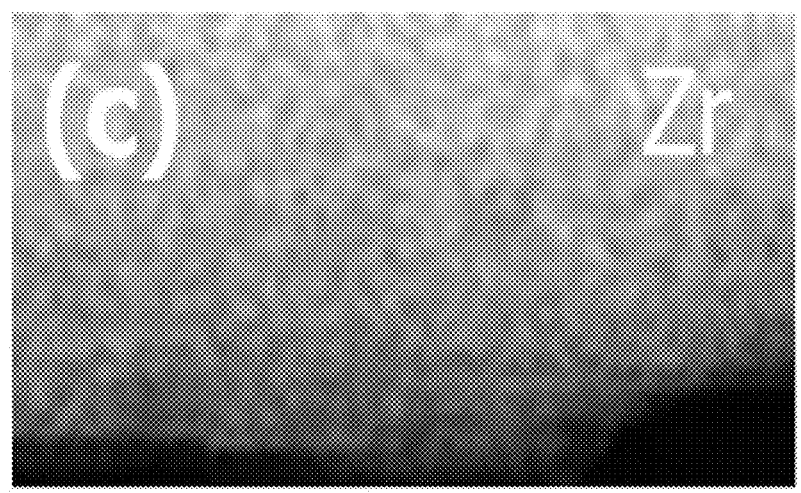
Figure 4D:
Figure 4E:
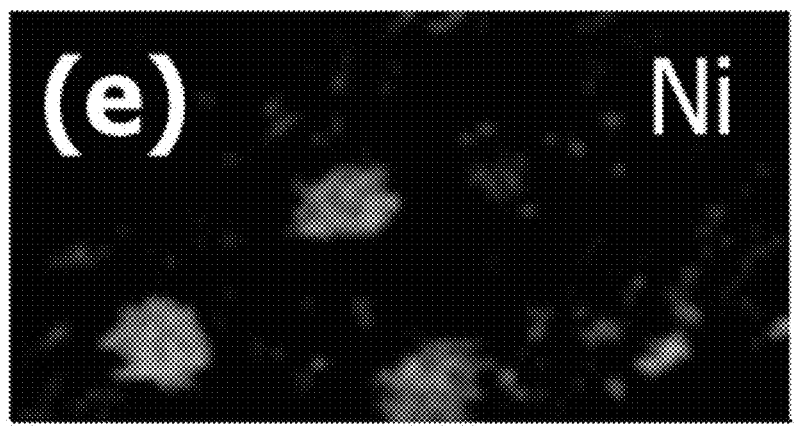

Meanwhile, FIG. 4A is a TEM-EDS image of the non-limiting Example (Pd—Ni/YSZ) of the present disclosure. FIG. 4B shows an enlargement of the square part in FIG. 4A, and FIGS. 4C to 4E show the elemental mapping of Zr, Pd, and Ni, respectively. It can be seen that the violet color part in FIG. 4E [a part seen as a spot in FIG. 4D] matches well with the orange color part in FIG. 4E [a part seen as a spot in FIG. 4E].

As described above, Pd nanoparticles were confirmed on Ni sites on the surface of Ni/YSZ. This result shows that Pd was alloyed at Ni sites of Ni/YSZ.

Evaluation of Dry Reforming Performance

A bio gas reforming [$CH_4+CO_2 \rightarrow 2CO+2H_2$] activity was measured in a fixed-bed reactor [Inner diameter: 9 mm/material used: quartz] under an atmospheric pressure using catalysts of Ni/YSZ (Comparative Example) and Pd—Ni/YSZ (Example). The inlet pressure of the reactor was measured using a commercially available pressure sensor/gauge (PSA-1, Autonics). The reactor (weight ca. 1.5 g; volume 1 mL) in which the prepared catalyst was placed was heated by an electric furnace equipped with a temperature controller (Hanyong Nux. Co., Ltd.). The heating and cooling rates were maintained at 5° C./min.

Before a desired reaction occurred, the corresponding catalyst was reduced in-situ by allowing 25% $H_2$/75% $N_2$ to flow at a flow rate of 200 sccm at 750° C. for 3 hours. The reactor was then flushed with $N_2$ for 30 minutes, and exposed to a reaction gas (total flow rate 200 sccm) being a mixture of methane, carbon dioxide, and nitrogen. The detailed reforming conditions are as follows:

Gas hourly space velocity (GHSV): 12,000/h

A flow rate (sccm) of $CH_4$:$CO_2$:$N_2$=50:50:100 (sccm)

A catalyst particle size obtained through sieving with consecutive pelletizing: 250 μm to 500 μm The inlet gas flow rate was adjusted by a mass flow controller (MFC; TSC-110, MKP).

Meanwhile, the steam in the produced gas was removed in a condenser at 5° C., and subsequently, the product gas mixture was analyzed by an online gas chromatography (Agilent 7890A). For reference, the online gas chromatography was equipped with two capillary columns [PorapakQ and molecular sieve] and two thermal conductivity detectors (TCD).

In order to evaluate the dry reforming activity of catalysts of Ni/YSZ (Comparative Example) and Pd—Ni/YSZ (Example), a bio gas dry reforming (methane dry reforming) reaction was performed in a temperature range of 600° C. to 800° C. For reference, the corresponding reaction formulae are as follows.

$$CH_4+CO_2 <\text{-}> 2H_2+2CO \tag{1}$$

$$CH_4 <\text{-}> C+2H_2 \tag{2}$$

$$C+CO_2 <\text{-}> 2CO \tag{3}$$

$$H_2+CO_2 <\text{-}> H_2O+CO \tag{4}$$

Figure 5:
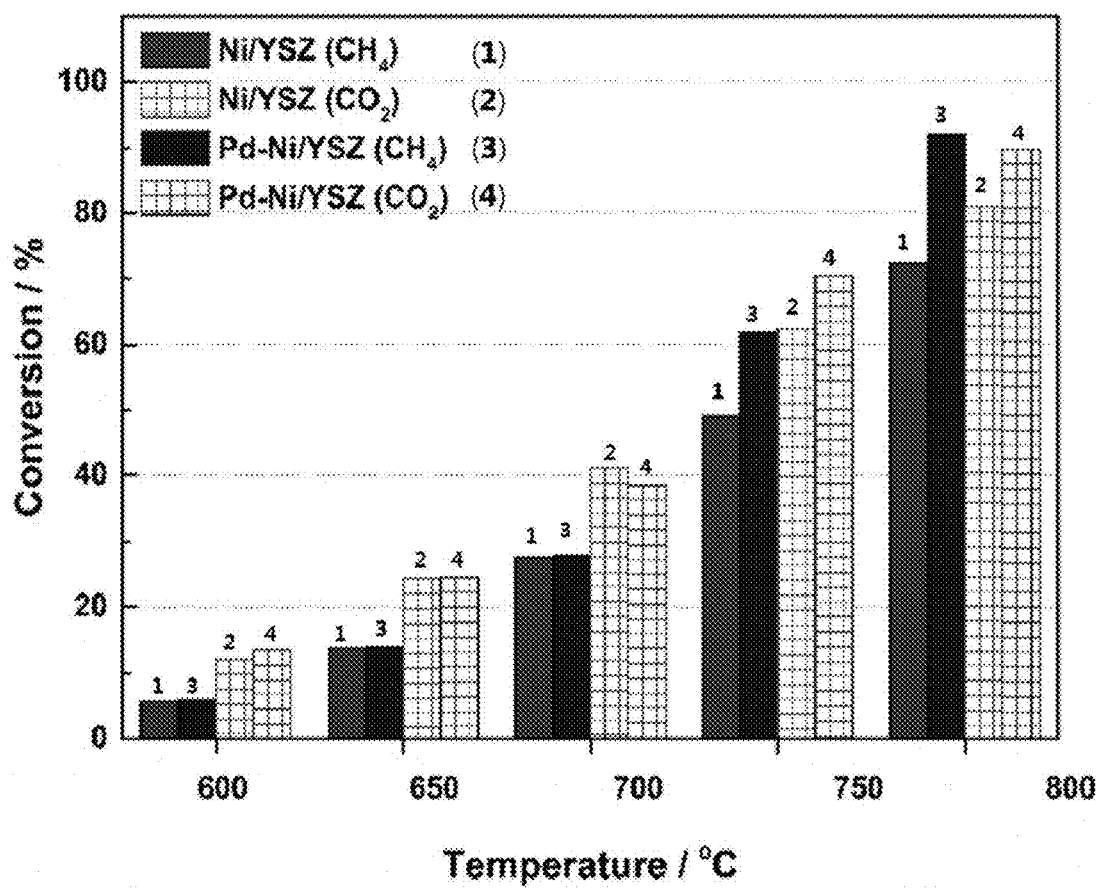
FIG. 5 is a graph showing the conversion rates of methane and carbon dioxide in a dry reforming using the catalysts in the Example (Pd—Ni/YSZ) and the Comparative Example (Ni/YSZ) of the present invention.

FIG. 5 is a graph showing the conversion rates of methane and carbon dioxide in a dry reforming using the catalysts in the Example (Pd—Ni/YSZ) and the Comparative Example (Ni/YSZ) of the present disclosure. In FIG. 5, the X-axis is the temperature (unit: ° C.), and the Y-axis is the conversion rate (unit: %). As described above, during the corresponding dry reforming, the gas hourly space velocity (GHSV) was 12,000/h, and the flow rate (sccm) of $CH_4$:$CO_2$:$N_2$ was 50:50:100 (sccm).

As shown in FIG. 5, the catalytic performances of the catalysts in the Comparative Example (Ni/YSZ) and the Example (Pd—Ni/YSZ) were similar to each other at a temperature of 600° C. to 700° C., and a conversion rate of less than about 30% was shown.

However, for the carbon dioxide and methane conversion rates obtained at 750° C. or more, the Example (Pd—Ni/YSZ) was significantly higher than the Comparative Example (Ni/YSZ). In particular, at 800° C., the catalyst in the Example showed a higher methane conversion rate by 20% than the catalyst in the Comparative Example. Likewise, at 750° C. or more, the Example (Pd—Ni/YSZ) showed an improved carbon dioxide conversion rate as compared with the Comparative Example (Ni/YSZ).

From the results, in order to significantly increase methane cracking and carbon removal (these are elements essential for the methane dry reforming), it can be seen that a high temperature (750° C. or more, particularly, 800° C. or more) may be required.

Furthermore, it can be seen that Pd alloyed with Ni on the YSZ surface serves to promote the oxidation of cracked carbon and accelerate methane activation.

In order to confirm this matter, an in-situ TGA experiment was performed to continuously monitor a carbon deposition process when methane and a nitrogen balance gas are supplied without carbon dioxide for 10 hours.

Figure 6:
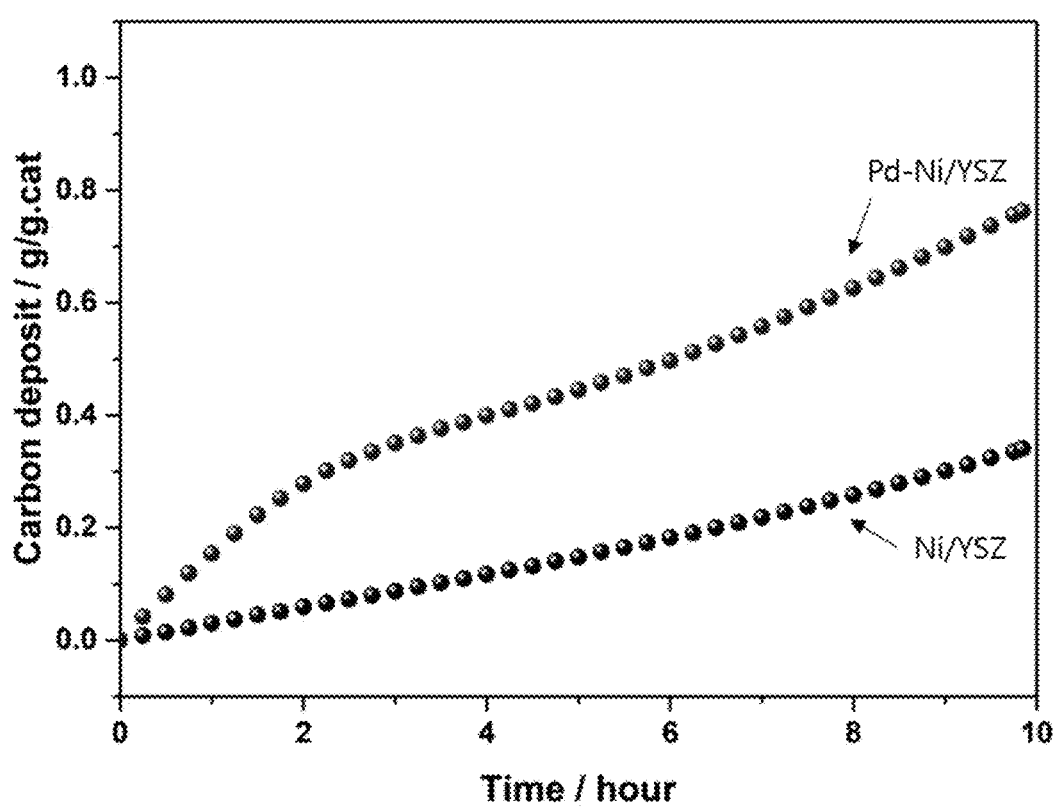
FIG. 6 shows evolution of the carbon deposition process for 10 hours using the catalysts in the Example (Pd—Ni/YSZ) and the Comparative Example (Ni/YSZ) of the present invention.

FIG. 6 shows evolution of the carbon deposition process for 10 hours using the catalysts in the Example (Pd—Ni/YSZ) and the Comparative Example (Ni/YSZ) of the present disclosure. In FIG. 6, the X-axis is the time (unit: hour), and the Y-axis on the left side indicates the carbon deposit [unit: g/g cat.]. In FIG. 6, the lower graph is the Comparative Example (Ni/YSZ), and the upper graph is the Example (Pd—Ni/YSZ).

The result shown in FIG. 6 is in accordance with the result in FIG. 5, and the initial amount of carbon deposited in the Example (Pd—Ni/YSZ) obtained at 750° C. for 2 hours under the same conditions was 5 times higher than that in the Comparative Example (Ni/YSZ).

Meanwhile, through a separate experiment, the catalysts in the Example (Pd—Ni/YSZ) and the Comparative Example (Ni/YSZ) were used as a catalyst for $CH_4$ cracking using a $CH_4/N_2$ gas at a temperature of 100° C. to 900° C. During the cooling, the reactor was purged with $N_2$, and then a carbon deposit continuously formed by $CO_2/N_2$ was oxidized.

Figure 7:
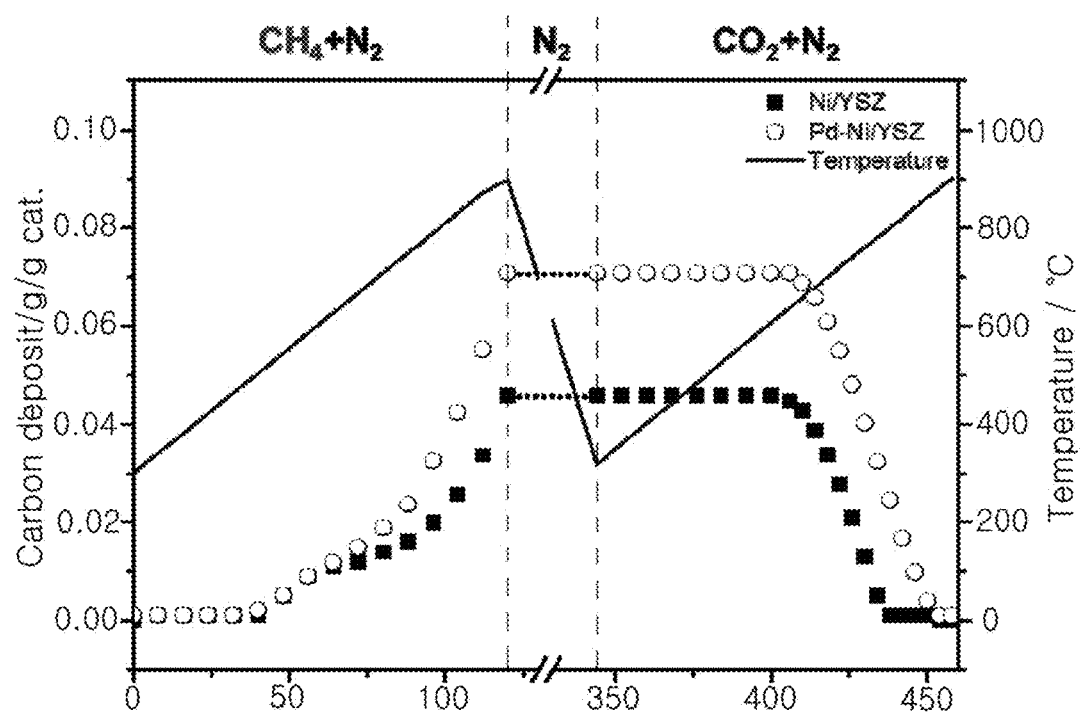
FIG. 7 is a graph showing a TGA analysis result during methane cracking with a continuous oxidation of carbon dioxide using the catalysts in the Example (Pd—Ni/YSZ) and the Comparative Example (Ni/YSZ) of the present invention.

FIG. 7 is a graph showing a TGA analysis result during methane cracking with a continuous oxidation of carbon dioxide using the catalysts in the Example (Pd—Ni/YSZ) and the Comparative Example (Ni/YSZ) of the present disclosure. In FIG. 7, the X-axis is the time (unit: minute), the Y-axis on the left side indicates carbon deposit [unit: g/g cat.], and the Y-axis on the right side indicates the temperature (unit: ° C.).

As can be seen even in FIG. 7, it was confirmed again that the degree of $CH_4$ cracking depends on the temperature. The degree of $CH_4$ decomposition showed a significant difference particularly at 750° C. or more. Furthermore, in carbon removal using $CO_2$ and subsequent coking up to 900° C., the Example of Pd—Ni/YSZ showed an improved rate of deposited carbon oxidation. (see "$CO_2+N_2$" part in FIG. 7)

Further, the carbon removal rate (3.87 $mg/g_{cat} \cdot K$) of Pd—Ni/YSZ in the Example showed a result which was faster by 21% than that of Ni/YSZ being the Comparative Example. These results show that the alloyed Pd nanoparticles at Ni sites promote both $CH_4$ cracking and $CO_2$ mediated carbon oxidation. This provides an improved catalytic activity and an improved durability.

In order to clarify electrical effects of the Pd—Ni alloying on activity in more detail, XPS studies were additionally performed.

Figure 8:
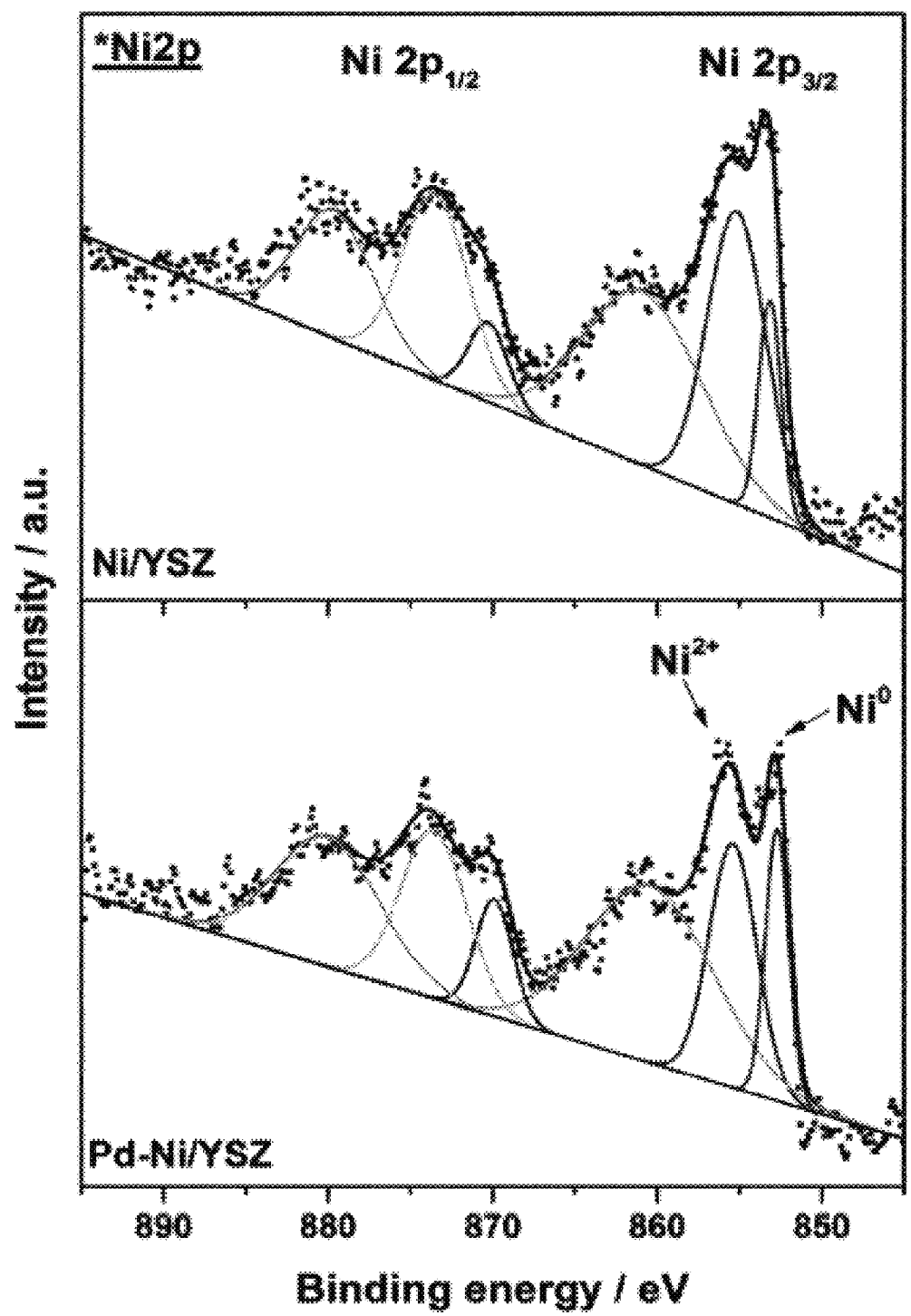
FIG. 8 shows XPS spectra (Ni 2p) of the Example (Pd—Ni/YSZ) and the Comparative Example (Ni/YSZ) of the present invention.

FIG. 8 shows XPS spectra (Ni 2p) of the Example (Pd—Ni/YSZ) and the Comparative Example (Ni/YSZ) of the present disclosure. In FIG. 8, the lower graph shows the Example (Pd—Ni/YSZ), and the upper graph shows the Comparative Example (Ni/YSZ).

The spectra obtained using the Comparative Example and the Example showed broad peaks corresponding to Ni 2p3/2 and Ni 2p1/2 at 850 eV to 870 eV and 870 eV to 890 eV, respectively.

In comparison with the Comparative Example (Ni/YSZ), the Ni 2p3/2 peak of the Example (Pd—Ni/YSZ) was subjected to deconvolution with three species [$Ni^0$, $Ni^{2+}$, and a satellite peak] having different relative amounts. Among these species, $Ni^0$ and $Ni^{2+}$ are particularly important in forecasting the activity for methane dry reforming.

Since the $Ni^0$ species greatly affects the initial methane cracking, a high ratio of $Ni^0/Ni^{2+}$ may provide high activity. Table 1 is a table which summarizes the XPS result values.

TABLE 1

| | XPS | | | | | |
|---|---|---|---|---|---|---|
| | $Ni^0$ | | | $Ni^{2+}$ | | |
| Ni $2p_{3/2}$ | Binding energy/ eV | Area (in-tegrated) | Area % | Binding energy/ eV | Area (integrated) | Area % |
| Ni/YSZ | 853.1 | 570.8929 | 22.1% | 855.2 | 2013.542 | 77.9% |
| Pd—Ni/ | 852.7 | 743.948 | 35.4% | 855.4 | 1358.071 | 64.6% |
| YSZ Difference | −0.43 | 173.06 | 13.3% | 0.23 | −655.47 | 13.3% |

As can be seen from Table 1, it can be seen that the Pd—Ni/YSZ in the Example, the area corresponding to the $Ni^0$ peak was increased by 13% as compared with the area of Ni/YSZ in the Comparative Example. Furthermore, the binding energy for $Ni^0$ in the Example (Pd—Ni/YSZ) was slightly decreased as compared with that of the Comparative Example (Ni/YSZ) [Example: 852.7 eV/Comparative Example: 853.1 eV].

These results show that the electron density of doped Pd nanoparticles was transferred to the Ni side during the alloying, thereby making the Pd nanoparticles at Ni sites in a more reduced state.

In the Pd—Ni/YSZ, the d-orbital hybridization between Ni and Pd was further monitored using a valence X-ray photoelectron spectroscopy. The monitoring result provides information on the valence d-orbital.

Figure 9:
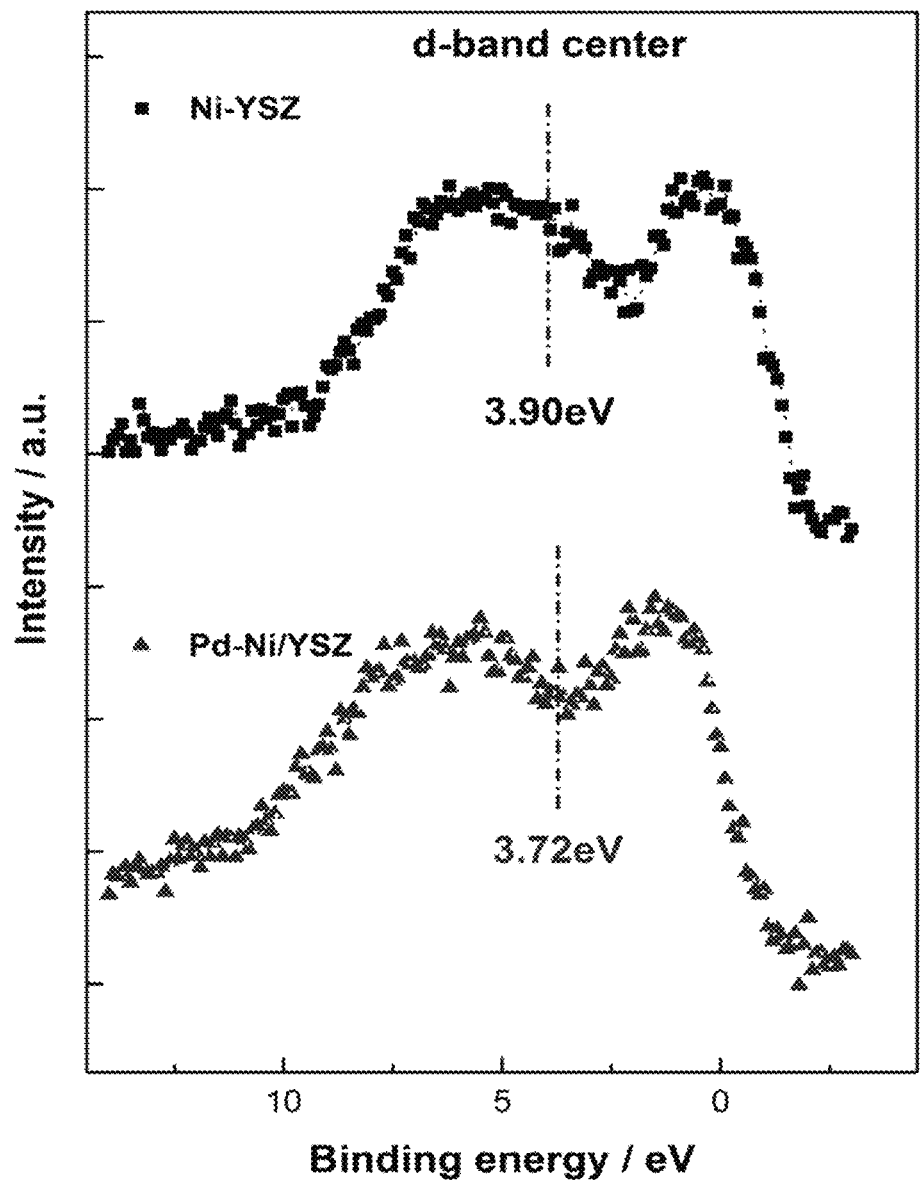
FIG. 9 shows valence XPS spectra of Ni in the Example (Pd—Ni/YSZ) and the Comparative Example (Ni/YSZ) of the present invention.

FIG. 9 shows valence XPS spectra of Ni in the Example (Pd—Ni/YSZ) and the Comparative Example (Ni/YSZ) of the present disclosure. In FIG. 9, the X-axis indicates the binding energy (eV), and the Y-axis indicates the intensity (unit: arbitrary unit).

As illustrated in FIG. 9, the d-band center in the Example (Pd—Ni/YSZ) slightly shifted toward the low energy side. The result is in accordance with the result (FIG. 8) obtained by XPS, supporting the charge transfer from Pd to Ni. The dry reforming activity using methane may be improved by an increased resistance for the Ni oxidation in the Pd—Ni/YSZ during the dry reforming.

Along with hydrogen production, methane activation ($CH_4$ activation) at Ni active sites produces a carbon seed (C*) at the initial stage, the corresponding carbon seeds (C*) are further reacted with each other to finally form a carbon-carbon network [for example, a carbon filament], and the carbon-carbon network causes a significant deactivation of the catalyst.

Accordingly, the role of $CO_2$ added is to produce CO which helps to prevent catalytic deterioration by being reacted with deposited carbon species such as another carbon species having C—C bonds and/or a carbon seed.

The carbon growth rate (C*+C*->C*-C*) on the surface of the Ni/YSZ catalyst is faster than the carbon removal rate (C*+O->C—O), and subsequently, the corresponding Ni/YSZ catalyst is rapidly deactivated. For reference, C* indicates carbon species deposited on the surface, and C indicates carbon species which are present on the surface of the catalyst or in a gas state.

Meanwhile, in order to identify the effects of Pd on carbon growth and carbon removal in the present Example, a density functional theory (DFT) method was performed by generating the structure of the Ni(111) and Pd—Ni(111) surfaces.

Figure 10:
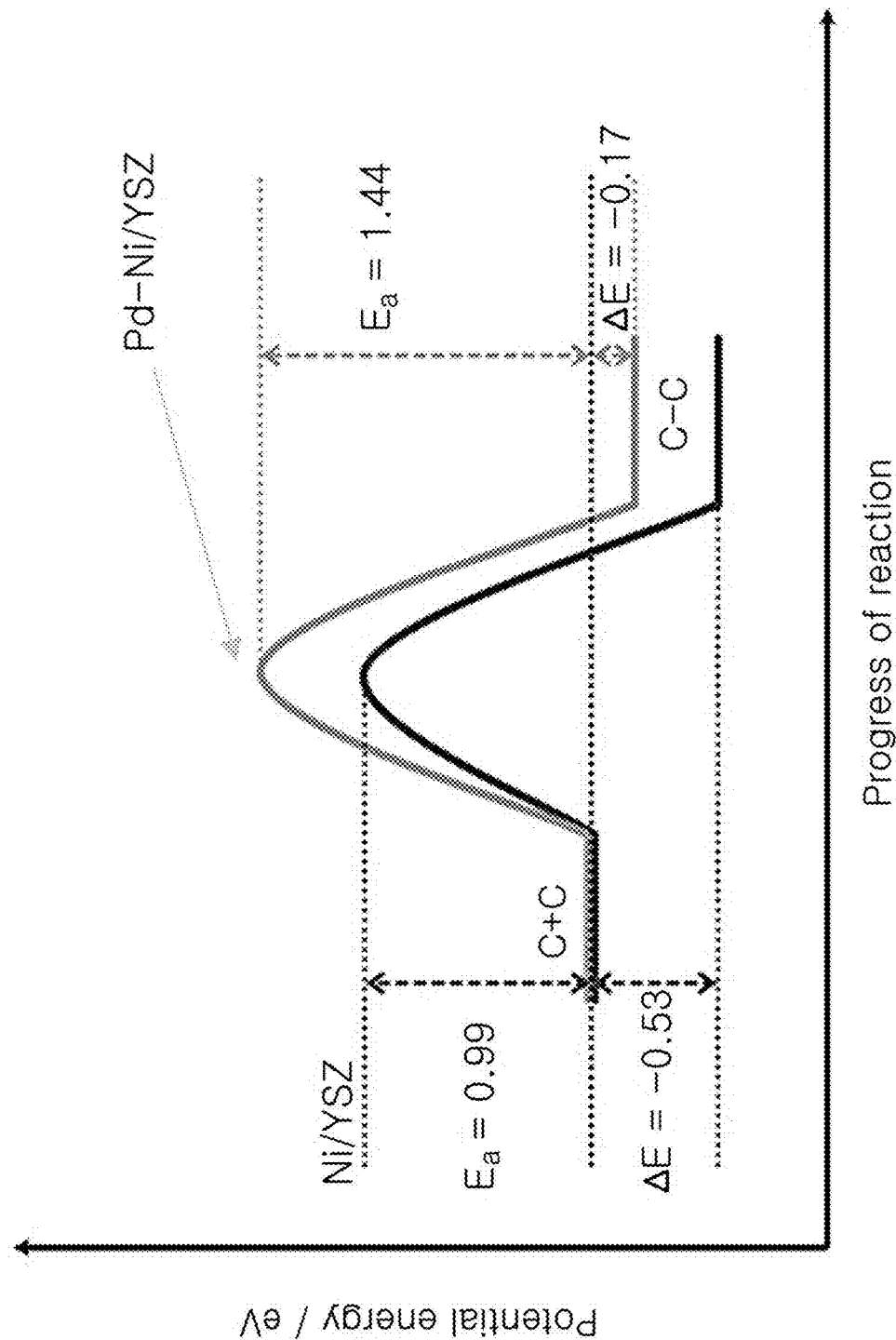
FIG. 10 is a graph showing the C—C bond formation energy of the Example (Pd—Ni/YSZ) and the Comparative Example (Ni/YSZ) of the present invention.
Figure 11:
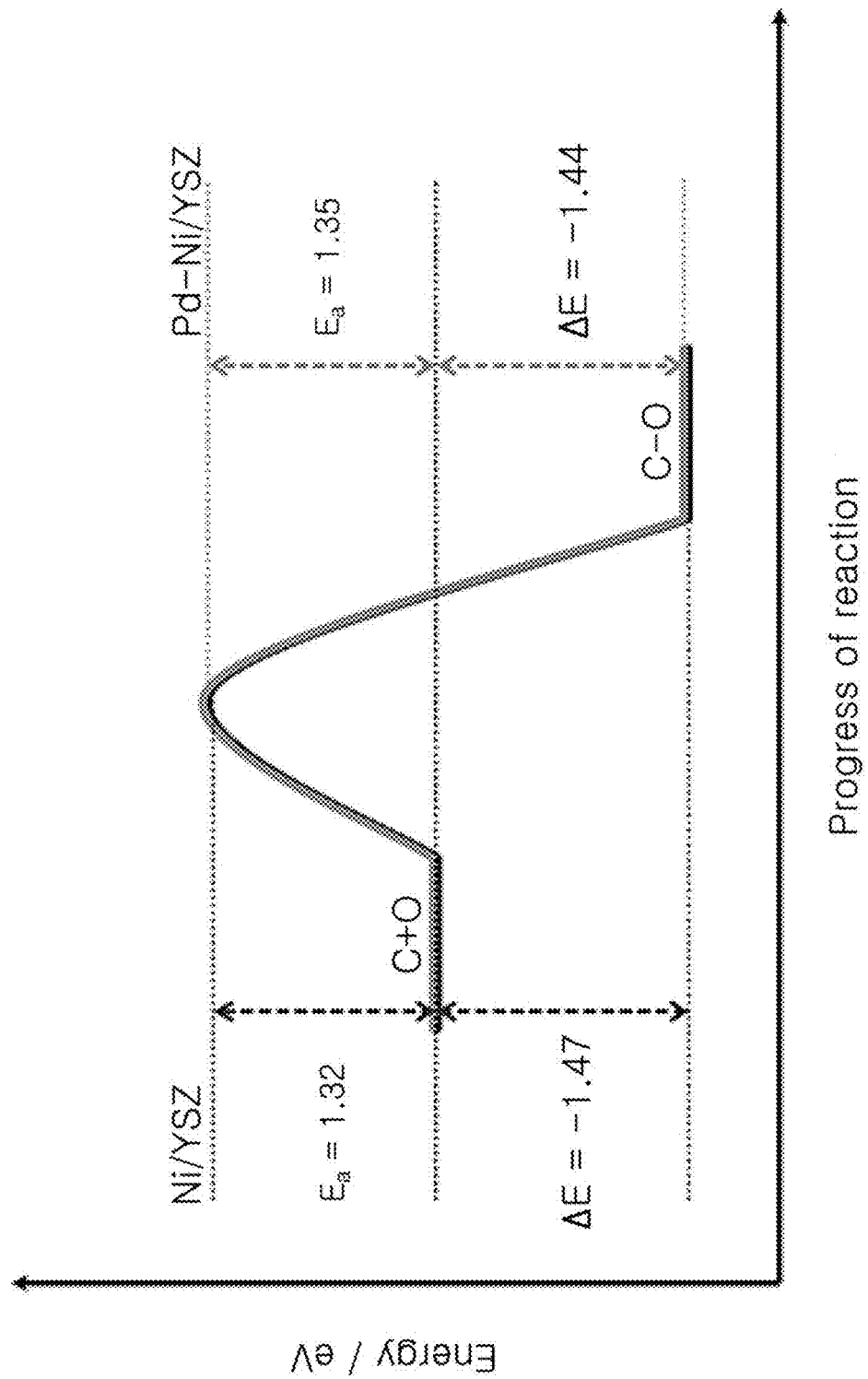
FIG. 11 is a graph showing the C—O bond formation energy of the Example (Pd—Ni/YSZ) and the Comparative Example (Ni/YSZ) of the present invention.
Figure 12:
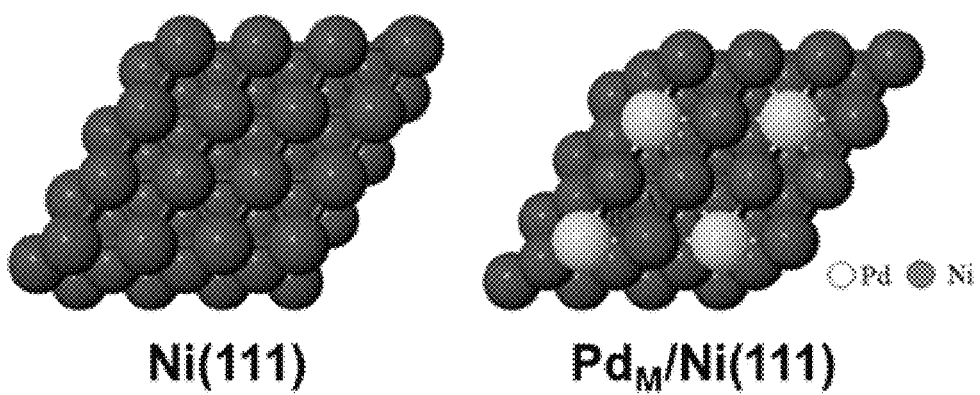
FIG. 12 is a schematic view showing that Pd is alloyed with nickel [Ni(111)] in the Example (Pd—Ni/YSZ) of the present invention.

FIG. 10 is a graph showing the C—C bond formation energy of the Example (Pd—Ni/YSZ) and the Comparative Example (Ni/YSZ) of the present disclosure, and FIG. 11 is a graph showing the C—O bond formation energy of the Example (Pd—Ni/YSZ) and the Comparative Example (Ni/YSZ) of the present disclosure. Further, FIG. 12 is a schematic view showing that Pd is alloyed with nickel [Ni(111)] in the Example (Pd—Ni/YSZ) of the present disclosure.

Figure 13:
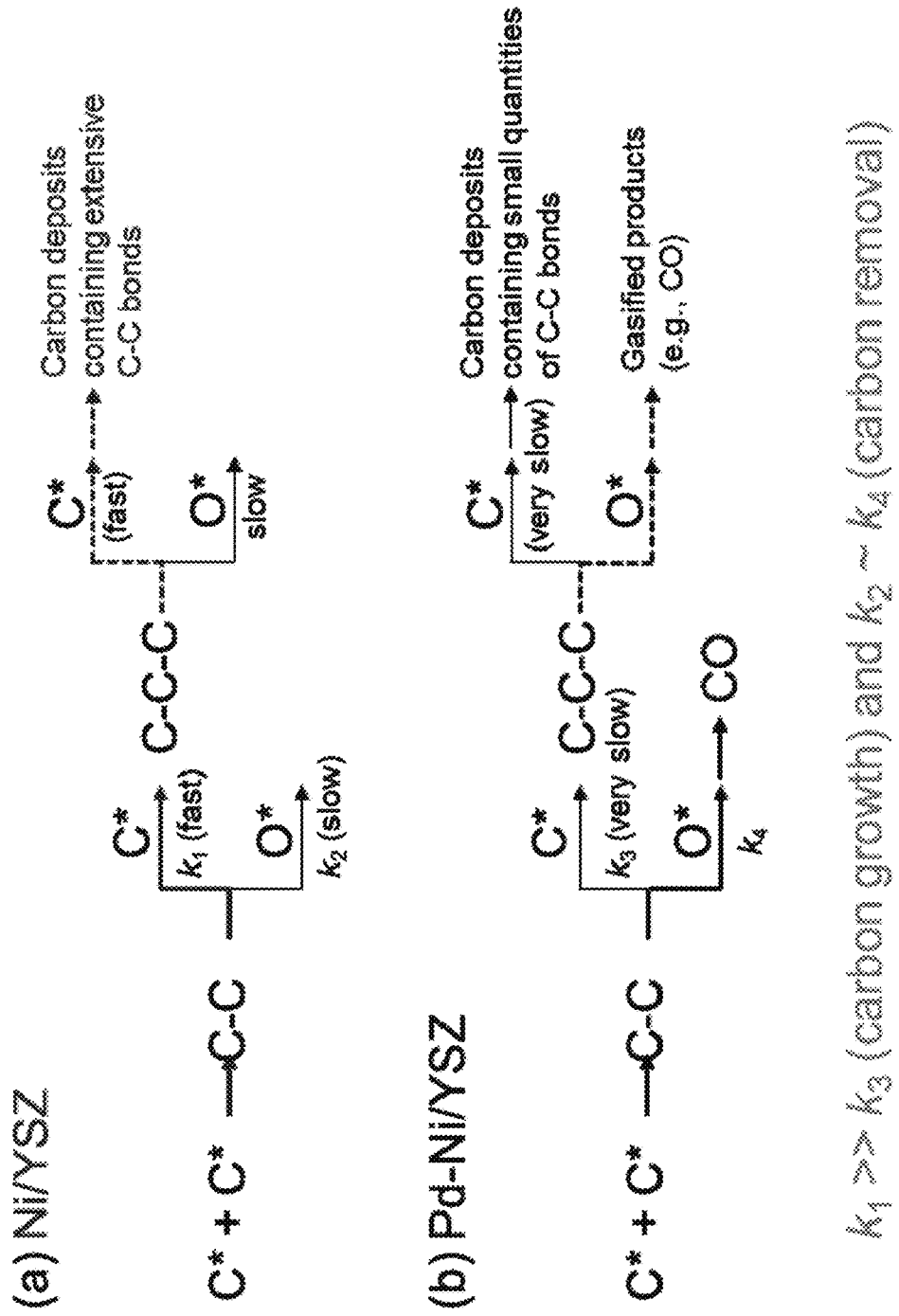
FIG. 13 shows a possible reaction process of carbon removal and carbon growth in the Example (Pd—Ni/YSZ) [(a) of FIG. 13] and the Comparative Example (Ni/YSZ) [(b) of FIG. 13] of the present invention.

Meanwhile, FIG. 13 shows a possible reaction process of carbon removal and carbon growth in the Example (Pd—Ni/YSZ) [(a) of FIG. 13] and the Comparative Example (Ni/YSZ) [(b) of FIG. 13] of the present disclosure. In FIG. 13, the solid line indicates a preferred route proposed based on the DFT method, and the dotted line indicates a possible route extended from the proposed route.

The following Table 2 summarizes the energy according to the reaction in the Ni(111) and the Pd/Ni(111).

TABLE 2

| Reaction | Ni(111) ΔE/eV | $E_a$/eV | Pd/Ni(111) ΔE/eV | $E_a$/eV | Remark |
|---|---|---|---|---|---|
| C + C > C—C | −0.53 | 0.96 | −0.17 | 1.82 | Carbon growth |
| C + O > C—O | −1.47 | 1.32 | −1.44 | 1.35 | Deposited carbon removal |

As shown in FIG. 10 and the Table 2, the Ni(111) shows an activation energy (Ea) of 0.96 Ev for carbon growth, whereas the Pd—Ni(111) shows a kinetic barrier of 1.82 eV.

Furthermore, the reaction energy (ΔE) for forming C—C on the Ni(111) was calculated as −0.53 eV, which is more stable by three times or more than the case of having the Pd—Ni(111).

Accordingly, it is thermodynamically and kinetically more preferable to form C—C on the Ni(111) rather than on the Pd—Ni(111).

In contrast, it was forecast that from the thermodynamic and kinetic point of view, the energies for forming C—O in the two catalysts were nearly the same as each other (see FIG. 11). That is, the Pd—Ni/YSZ being the Example has a higher barrier for forming a C—O bond by 0.03 eV than that of Ni/YSZ being the Comparative Example, but is calculated to be slightly less stable than the Ni/YSZ. These results mean that even though a carbon seed is produced in an increased amount due to the improved activity in the presence of the Pd—Ni/YSZ, Pd which is alloyed at Ni sites improves durability by suppressing carbon growth rather than promoting carbon oxidation.

In other words, Ni/YSZ induces a significant formation of C—C networks, which is difficult to remove by CO, whereas the Pd—Ni/YSZ suppresses carbon deposit formation which retains a large amount of C—C bonds from the produced carbon seed (see FIG. 13).

Evaluation of Long-Term Durability

In order to evaluate the long-term stability, methane dry reforming was performed for 100 hours using the following conditions for the two catalysts in the Example and the Comparative Example.

Operating temperature: 750° C.
Gas hourly space velocity (GHSV): 12,000/h
Catalyst volume: 1 mL
A flow rate (sccm) of $CH_4:CO_2:N_2$=50:50:100 (sccm)

Figure 14:
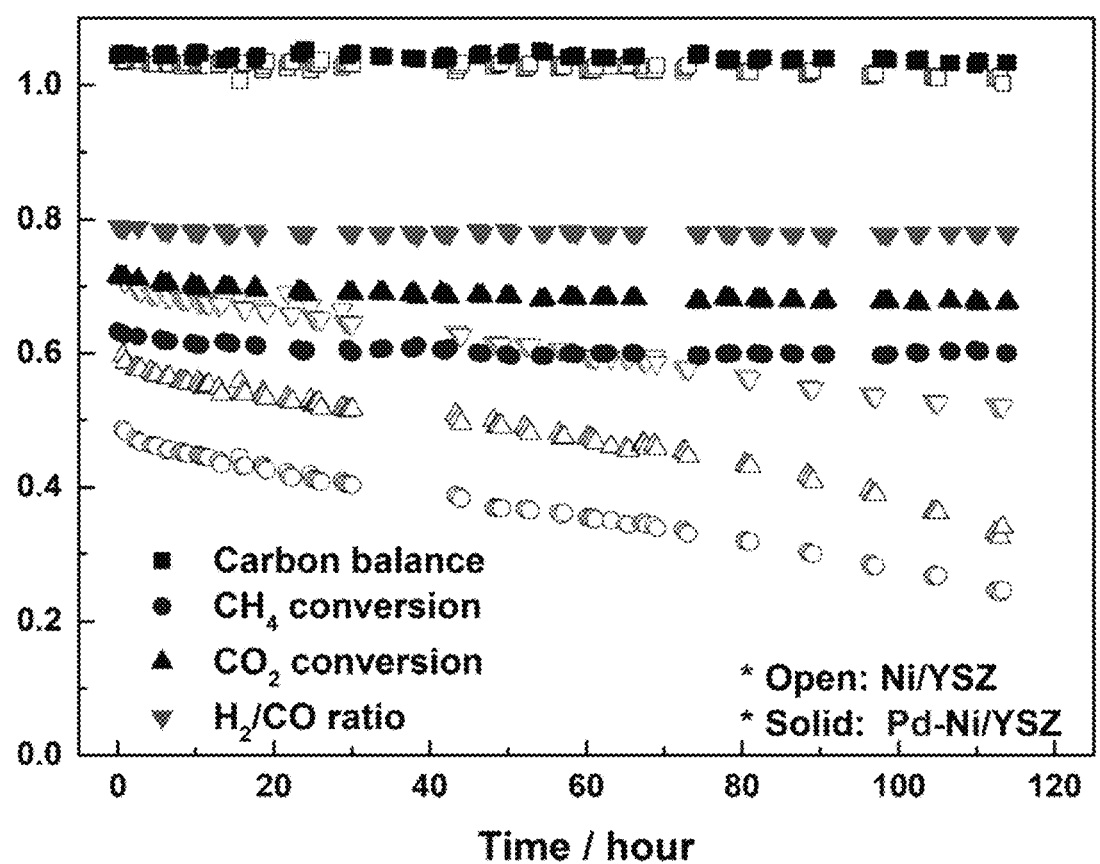
FIG. 14 is a graph showing the long-term stability test result of the methane dry reforming using the catalysts in the Example (Pd—Ni/YSZ) and the Comparative Example (Ni/YSZ) of the present invention.

FIG. 14 is a graph showing the long-term stability test result of the methane dry reforming using the catalysts in the Example (Pd—Ni/YSZ) and the Comparative Example (Ni/YSZ) of the present invention. In FIG. 14, the X-axis is the time (unit: hr), and the Y-axis is the conversion rate (Concentration; denoted based on a conversion degree of 1) (unit: none).

As shown in FIG. 14, the Pd—Ni/YSZ in the Example showed a catalyst deactivation at a negligible level, in which the degradation rate was 0.021%/h for 100 hours, whereas the Ni/YSZ in the Comparative Example showed a continuous deactivation, in which the degradation rate was 0.19%/h for 100 hours. Furthermore, the Pd—Ni/YSZ showed a rather increased $CH_4$ and $CO_2$ conversion rate.

Meanwhile, in order to quantify the amount of carbon deposit produced during the reforming reaction while performing long-term experiments, a temperature programmed oxidation (TPO) was performed using the catalyst used.

Figure 15:
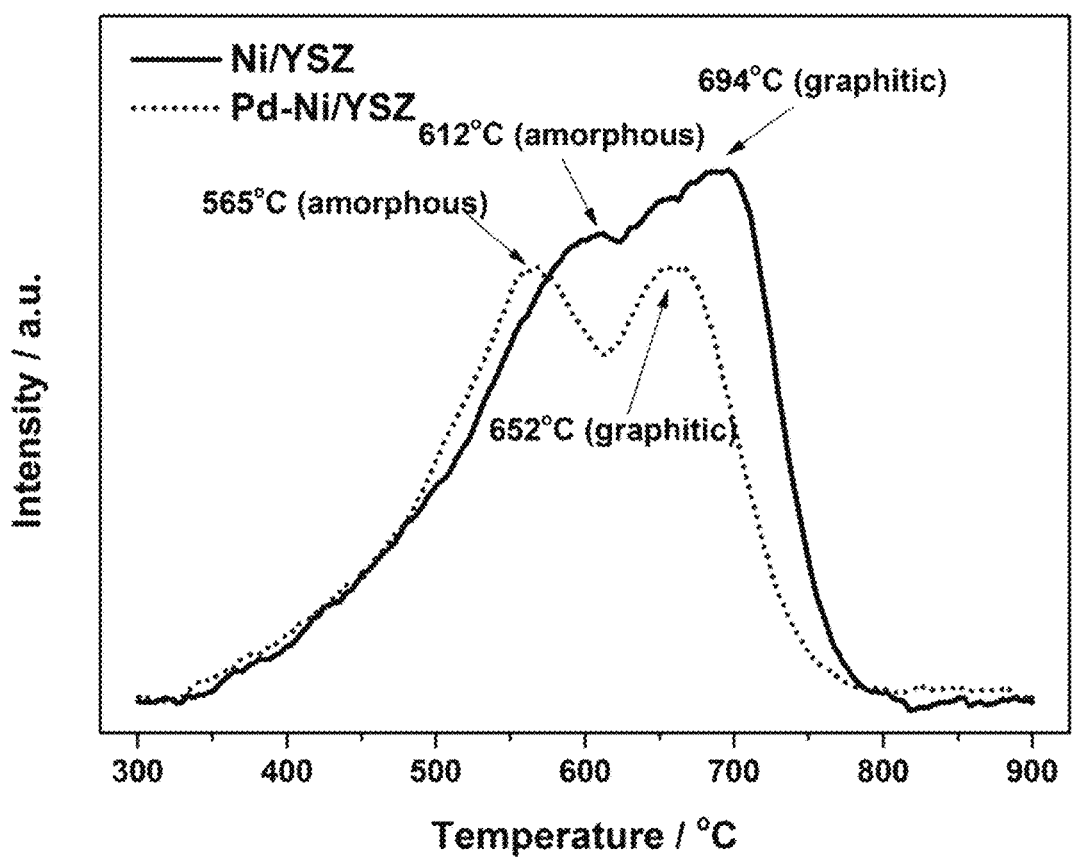
FIG. 15 shows a result in which a temperature-programmed oxidation (TPO) is performed on the catalyst used in order to perform a long-term stability test.

FIG. 15 shows a result in which a temperature-programmed oxidation (TPO) is performed on the catalyst used in order to perform a long-term stability test. In FIG. 15, the X-axis is the temperature (unit:), and the Y-axis is the intensity (unit: arbitrary unit). In FIG. 15, the Comparative Example (Ni/YSZ) is indicated with a solid line, and the Example (Pd—Ni/YSZ) is indicated with a dotted line.

Meanwhile, Table 3 summarizes peaks having the maxima in the TPO profile.

TABLE 3

| | Peak #1/° C. | Peak #2/° C. | Area (Arbitrary Unit) |
|---|---|---|---|
| Comparative Example Ni/YSZ | 612 | 694 | 6.87 |
| Example Pd—Ni/YSZ | 565 | 652 | 5.81 |
| Difference | −47 | −42 | −15.4% |

As can be seen from FIG. 15 and Table 3, the TPO profile of the Pd—Ni/YSZ being the Example showed two broad peaks centered at 565° C. and 652° C.

These peaks show that at least two different carbon-containing species such as amorphous carbon and graphitic carbon are present. Similarly, the Ni/YSZ in the Comparative Example showed two broad peaks centered at 612° C. and 694° C. However, in the case of the Ni/YSZ, the TPO peak appearing at a temperature higher than 694° C. seems to be predominant over the Pd—Ni/YSZ.

Furthermore, the total amount of carbon deposit obtained from the Ni/YSZ being the Comparative Example was larger than the total amount of carbon deposit obtained from the Pd—Ni/YSZ of the Example. These results mean that produced carbon species containing a relatively small amount of C—C bonds are rapidly gasified by oxidation prior to carbon growth which induces a large amount of C—C bonds formed, and are in accordance with the density functional theory (DFT) experimental results.

Non-limiting and exemplary Examples of the present invention have been explained as described above, but the technical spirit of the present invention is not limited by the accompanying drawings or the aforementioned explanation. It is obvious to a person with ordinary skill in the art that various modifications are possible within the scope not departing from the technical spirit of the present invention, and the modification also fall within the claims of the present invention.

INDUSTRIAL APPLICABILITY

The present specification relates to a dry reforming catalyst, a method for preparing the same, and a dry reforming method using the catalyst. The catalyst may be very usefully used in dry-reforming a fuel cell, particularly, a solid oxide fuel cell.

What is claimed is:

1. A dry reforming catalyst, wherein the dry reforming catalyst comprises a noble metal (M) that is doped to a nickel yttria stabilized zirconia complex (Ni/YSZ) and an alloy (M-Ni alloy) of the noble metal (M) and nickel is formed at Ni sites on a surface of the nickel yttria stabilized zircona (YSZ).

2. The dry reforming catalyst according to claim 1, wherein the noble metal (M) is Pd, Pt, Ru, Rh, Au, or Ag.

3. The dry reforming catalyst according to claim 1, wherein the noble metal (M) is Pd.

4. The dry reforming catalyst according to claim 1, wherein an electrical structure of Ni is changed by the alloying of noble metal with Ni at the Ni sites.

5. The dry reforming catalyst according to claim 1, wherein during the alloying of noble metal with Ni at the Ni sites, a charge transfer occurs from the noble metal particles to the Ni side.

6. The dry reforming catalyst according to claim 1, wherein the alloying of noble metal with Ni at the Ni sites changes an oxidation state of nickel into a reduced state.

7. The dry reforming catalyst according to claim 1, wherein the alloying of noble metal with Ni at the Ni sites increases resistance to oxidation of nickel.

8. The dry reforming catalyst according to claim 1, wherein the alloying of noble metal with Ni at the Ni sites suppresses carbon growth or carbon deposit formation.

9. The dry reforming catalyst according to claim 1, wherein the alloyed noble metal-nickel alloy (M-Ni alloy) at the Ni sites promotes both $CH_4$ cracking and $CO_2$ mediated carbon oxidation.

10. The dry reforming catalyst according to claim 1, wherein the alloyed noble metal-nickel alloy (M-Ni alloy) at the Ni sites promotes the oxidation of cracked carbon and promotes methane activation.

11. The dry reforming catalyst according to claim 1, wherein the catalyst is used for dry reforming at a temperature of 750° C. or more.

12. The dry reforming catalyst according to claim 1, wherein the catalyst is used for dry reforming at a temperature of 800° C. or more.

13. The dry reforming catalyst according to claim 1, wherein the catalyst is used for dry reforming at a temperature of 750° C. to 900° C. or 800° C. to 900° C.

14. The dry reforming catalyst according to claim 1, wherein the catalyst is a dry reforming catalyst for improving dry reforming performance and long-term stability of a nickel yttria stabilized zirconia (Ni/YSZ).

15. The dry reforming catalyst according to claim 1, wherein the catalyst maintains an initial activity after being operated for 120 hours or more.

16. The dry reforming catalyst according to claim 1, wherein the catalyst is a dry reforming catalyst of a solid oxide fuel cell.

17. A solid oxide fuel cell comprising the dry reforming catalyst according to claim 1.

18. The solid oxide fuel cell according to claim 17, wherein the catalyst is a fuel electrode catalyst of the solid oxide fuel cell.

* * * * *